US012809164B2

(12) United States Patent
Konno et al.

(10) Patent No.: US 12,809,164 B2
(45) Date of Patent: Nov. 24, 2026

(54) ANGLE SELECTION TYPE TRANSMISSION ELEMENT AND DISPLAY DEVICE

(71) Applicant: CANON KABUSHIKI KAISHA, Tokyo (JP)

(72) Inventors: Yoshihiko Konno, Tokyo (JP); Nobuyoshi Suzuki, Tokyo (JP); Manabu Sueoka, Kanagawa (JP); Hirohito Kai, Tokyo (JP); Kiyoshi Nitto, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 677 days.

(21) Appl. No.: 18/172,374

(22) Filed: Feb. 22, 2023

(65) Prior Publication Data

US 2023/0204947 A1 Jun. 29, 2023

Related U.S. Application Data

(63) Continuation of application No. PCT/JP2021/028109, filed on Jul. 29, 2021.

(30) Foreign Application Priority Data

Sep. 10, 2020 (JP) ................................ 2020-152165
Mar. 19, 2021 (JP) ................................ 2021-045660

(51) Int. Cl.
*G02B 27/00* (2006.01)
*G02B 1/118* (2015.01)
(Continued)

(52) U.S. Cl.
CPC .......... *G02B 27/0018* (2013.01); *G02B 1/118* (2013.01); *G02B 27/02* (2013.01); *H04N 13/344* (2018.05); *G02B 2207/123* (2013.01)

(58) Field of Classification Search
CPC .......... G02B 2207/123; G02B 27/0018; G02B 27/02; G02B 1/118; H04N 13/344
See application file for complete search history.

(56) References Cited

U.S. PATENT DOCUMENTS 5,254,388 A * 10/1993 Melby .................... H01J 29/89 428/218
6,052,239 A 4/2000 Matsui et al.
(Continued)

FOREIGN PATENT DOCUMENTS

JP 5-215908 A 8/1993
JP 10-222093 A 8/1998
(Continued)

OTHER PUBLICATIONS

Wolfram MathWorld, Semiregular Tessellation; copy attached to this Office Action; url: https://mathworld.wolfram.com/SemiregularTessellation.html; as captured on Wayback Archive from Feb. 23, 2016 (Year: 2016).*
(Continued)

*Primary Examiner* — Thomas A Hollweg
*Assistant Examiner* — Kirsten D. Endresen
(74) *Attorney, Agent, or Firm* — Cowan, Liebowitz & Latman, P.C.

(57) ABSTRACT

A head-mounted display (HMD) includes an electronic viewfinder. An angle selection type transmission element is provided on an optical path of the electronic viewfinder. The angle selection type transmission element is provided at a location facing an eyepoint and includes a plurality of opening portions as a limiter that limits a passage direction of light to a predetermined range. In the angle selection type transmission element, limitation angle range in the passage
(Continued)

direction of the light is different in at least two regions and light in a direction other than the eyepoint can be limited or blocked.

12 Claims, 27 Drawing Sheets

(51) Int. Cl.
*G02B 27/02* (2006.01)
*H04N 13/344* (2018.01)

(56) References Cited

U.S. PATENT DOCUMENTS

| | | | | |
|---|---|---|---|---|
| 8,233,114 | B2 | 7/2012 | Mimura et al. | |
| 8,848,139 | B2 | 9/2014 | Niioka et al. | |
| 2007/0121325 | A1* | 5/2007 | Barber | F21V 11/02 362/290 |
| 2007/0242334 | A1* | 10/2007 | Selbrede | G02B 6/00 359/853 |
| 2008/0089068 | A1* | 4/2008 | Mimura | G03F 7/0007 264/1.36 |
| 2019/0146129 | A1* | 5/2019 | Mockarram-Dorri | G02B 27/026 359/630 |
| 2020/0103650 | A1 | 4/2020 | Woods | |

FOREIGN PATENT DOCUMENTS

| | | |
|---|---|---|
| JP | 2007-003951 A | 1/2007 |
| JP | 2008-116913 A | 5/2008 |
| JP | 2008-152017 A | 7/2008 |

OTHER PUBLICATIONS

Wikipedia, Aerogel article; with this office action; accessed on Oct. 31, 2025 at url: https://en.wikipedia.org/wiki/Aerogel#:~:text=An%20aerogel%20material%20can%20range,of%20space%20within%20the%20material (Year: 2025).*

International Search Report dated Sep. 14, 2021 of the corresponding International Application No. PCT/JP2021/028109.

* cited by examiner

ANGLE SELECTION TYPE TRANSMISSION ELEMENT AND DISPLAY DEVICE

CROSS-REFERENCE TO RELATED APPLICATIONS

This application is a Continuation of International Patent Application No. PCT/JP2021/028109, filed Jul. 29, 2021, which claims the benefit of Japanese Patent Application No. 2020-152165, filed Sep. 10, 2020, and Japanese Patent Application No. 2021-045660, filed Mar. 19, 2021, all of which are hereby incorporated by reference herein in their entirety.

BACKGROUND OF THE INVENTION

Field of the Invention

The present invention relates to a technology for reducing ghosting in a finder of a camera, a head-mounted display, a binocular telescope, or the like, and more particularly relates to an angle selection type transmission element mounted on a finder.

Description of the Related Art

When users use finders of cameras or head-mounted displays outdoors, there is a possibility of ghosting occurring due to light arriving from the sides behind the users. To reduce unnecessary light caused due to light from the outside, Japanese Patent Laid-Open No. H5-215908 discloses a technology for cutting out light which is a cause of ghosting by providing a louver film on an eye side of a display unit.

In the technology of the related art disclosed in Japanese Patent Laid-Open No. H5-215908, light in a light-shielding direction of a louver film provided in a display unit is cut out. Therefore, since vignetting of a peripheral unit occurs in a use in which a user brings her or his eyes close to a finder or the like, this method cannot be applied.

SUMMARY OF THE INVENTION

The present invention provides an angle selection type transmission element capable of allowing eyepiece observation to be performed without involving vignetting of a peripheral unit while reducing ghosting caused by light from the outside.

An optical element according to an embodiment of the present invention is an angle selection type transmission element provided on an optical path. The angle selection type transmission element includes a limiter configured to limit a passage direction of a light flux. Passage portions in which the light flux passes in the limiter are formed radially centering on pre-decided points 3-dimensionally.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings. A head-mounted display (hereinafter referred to as an HMD) will be described as an example of a display device to which an angle selection type transmission element provided on an optical path of a finder or the like is applied. The present invention is not limited thereto and any of various optical device can be applied.

First Embodiment

Figure 1:
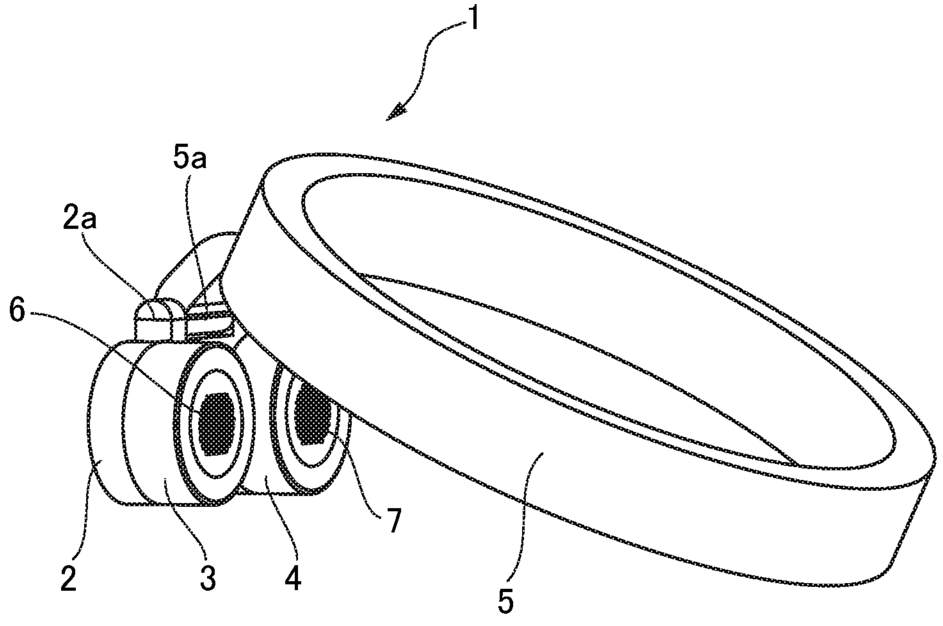
FIG. 1 is an external view illustrating a display device (a head-mounted display) to which the present invention is applied.

An angle selection type transmission element according to a first embodiment of the present invention will be described with reference to FIGS. 1 to 11. FIG. 1 is an external view illustrating an exemplary configuration of an HMD 1. The HMD 1 includes a body unit 2, electronic viewfinders (hereinafter referred to as an EVFs) 3 and 4, and a head mount unit 5. The pair of EVFs are a left-eye EVF 3 and a right-eye EVF 4.

The body unit 2 and the head mount unit 5 of the HMD 1 are coupled rotatably by a hinge 2*a* on the body unit 2 side and a hinge 5*a* of the head mount unit 5 side. The left-eye EVF 3 and the right-eye EVF 4 are kept so that an interpupillary distance can be adjusted with respect to the body unit 2.

Figure 2:
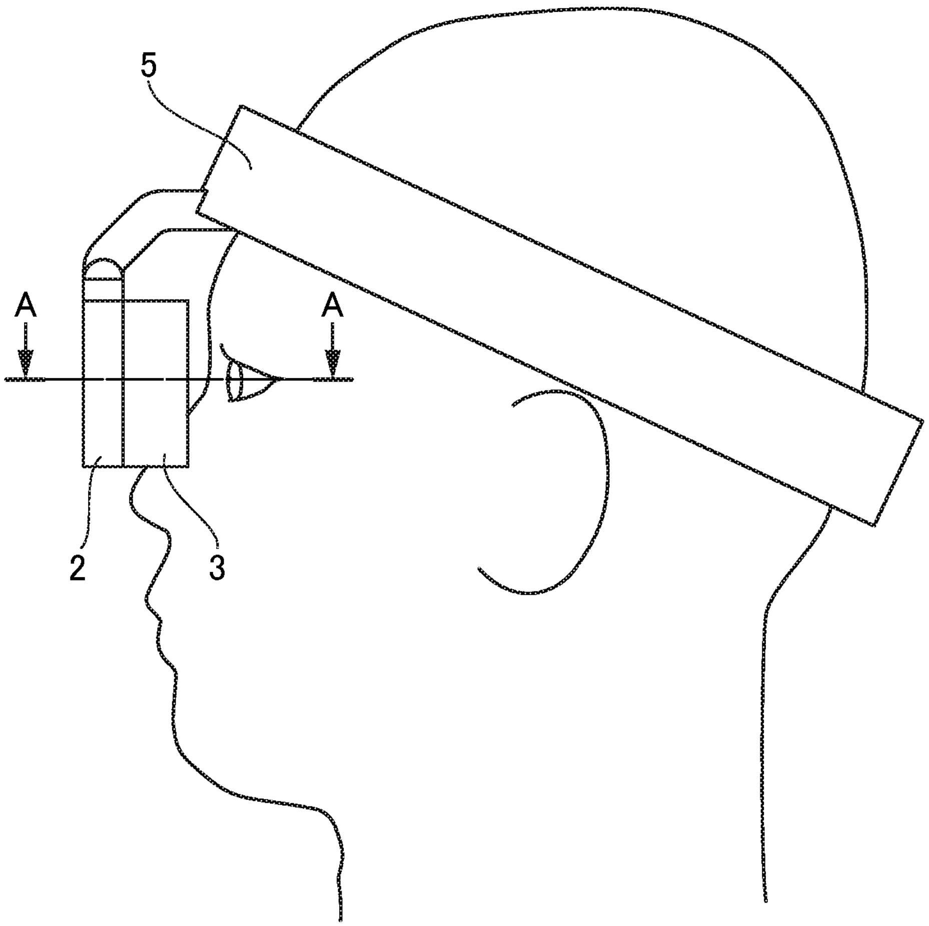
FIG. 2 is a diagram illustrating a use state in which a user wears a display device on her or his head.
Figure 3:
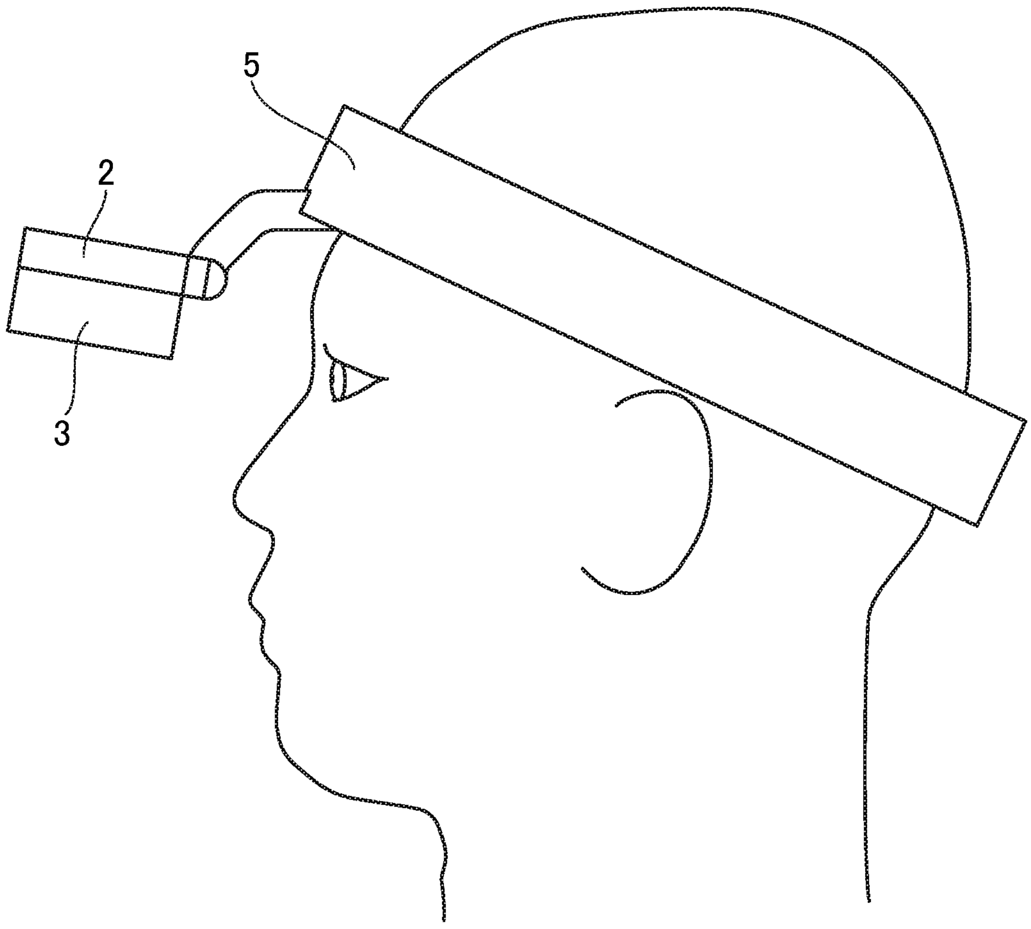
FIG. 3 is a diagram illustrating a state in which a display unit is lifted upward from the state of FIG. 2.

FIGS. 2 and 3 illustrate a state in which a user wears the HMD 1 on her or his head. FIG. 2 illustrates a state in which the user is viewing a display screen and FIG. 3 illustrates a state in which the body unit 2 of the HMD 1 is lifted upward so that the user can view surroundings.

Angle selection type transmission elements 6 and 7 are mounted on portions in which the user looks in the EVFs 3 and 4, respectively. The angle selection type transmission elements 6 and 7 according to the present embodiment have the same configuration. However, by configuring both elements differently, it is possible to optimize ghosting-cutting characteristics and an angle of convergence of right and left eyes.

Figure 4:
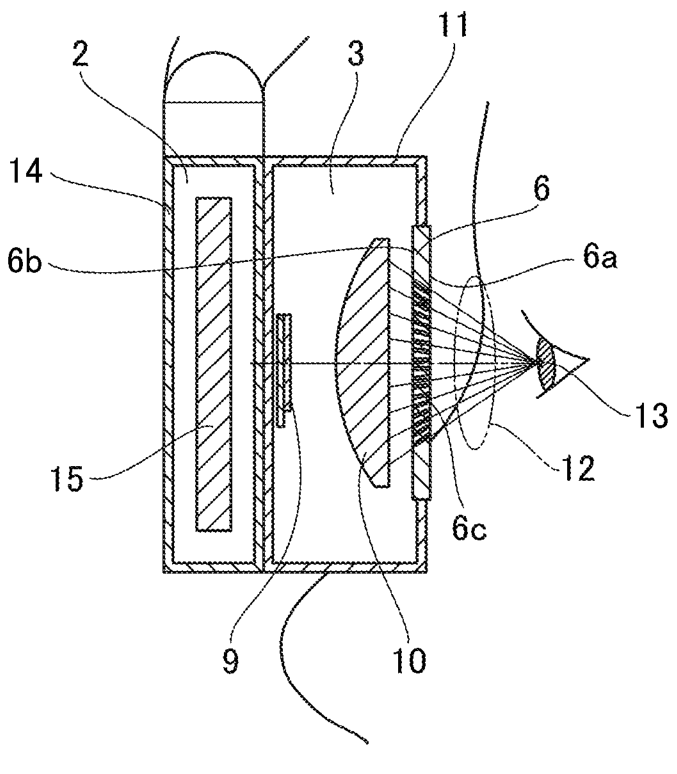
FIG. 4 is a sectional view illustrating a configuration of the display device at the time of use.

FIG. 4 is a sectional view illustrating a configuration of the body unit 2 and the EVF 3 in a state in which the HMD 1 is used and illustrates a portion corresponding to the left eye of the user. A display unit 9 and an eyepiece lens system 10 are provided inside an exterior member 11 of the EVF 3. The display unit 9 includes an electro-luminescence (EL) display panel. In the eyepiece lens system 10, a surface on the angle selection type transmission element 6 side is a planar surface. The angle selection type transmission element 6 is provided at a position facing the left eye of the user in the exterior member 11. A first surface 6*a* in the angle selection type transmission element 6 is set as a surface on the eye side of the user and a second surface 6*b* is set as a surface on the eyepiece lens system 10 side.

In the angle selection type transmission element 6, a plurality of opening portions 6*c* are provided to have a function of limiting a light passage direction. The plurality of opening portions 6*c* configure a limiter that limits a passage direction of a light flux in the angle selection type transmission element disposed on an optical path. Portions in which the light flux passes are formed radially centering on pre-decided points 3-dimensionally (spatially). The pre-decided points are points on the optical axis separated from the angle selection type transmission element 6. For example, the plurality of opening portions 6*c* open in a direction of the light flux oriented from the eyepiece lens system 10 to a position of the eyepoint 13 which is a position of the eye of the user. FIG. 4 schematically illustrates a light flux 12 arriving at the eyepoint 13 in the light flux emitted from the eyepiece lens system 10. The position of the eyepoint 13 is determined by the eyepiece lens system 10.

An exterior member 14 of the body unit 2 includes a control circuit 15 that controls the entire HMD 1 therein. The control circuit 15 controls the display unit 9 such that light from the display unit 9 is condensed by the eyepiece lens system 10 and passes through the plurality of opening portions 6*c* provided in the angle selection type transmission element 6, and thus display information on the display unit 9 is observed by the eye located at the position of the eyepoint 13.

Figure 5:
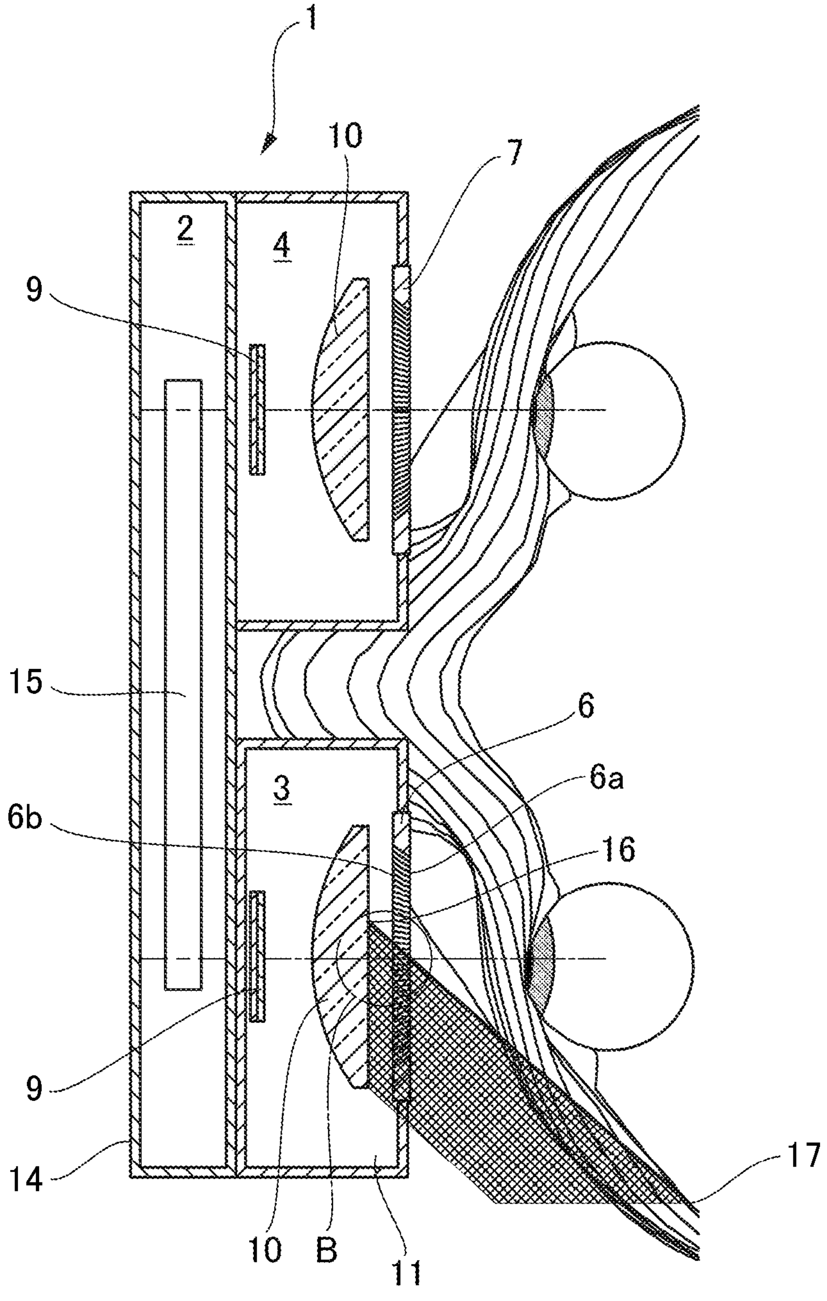
FIG. 5 is a sectional view taken along the line A-A of FIG. 2.
Figure 6:
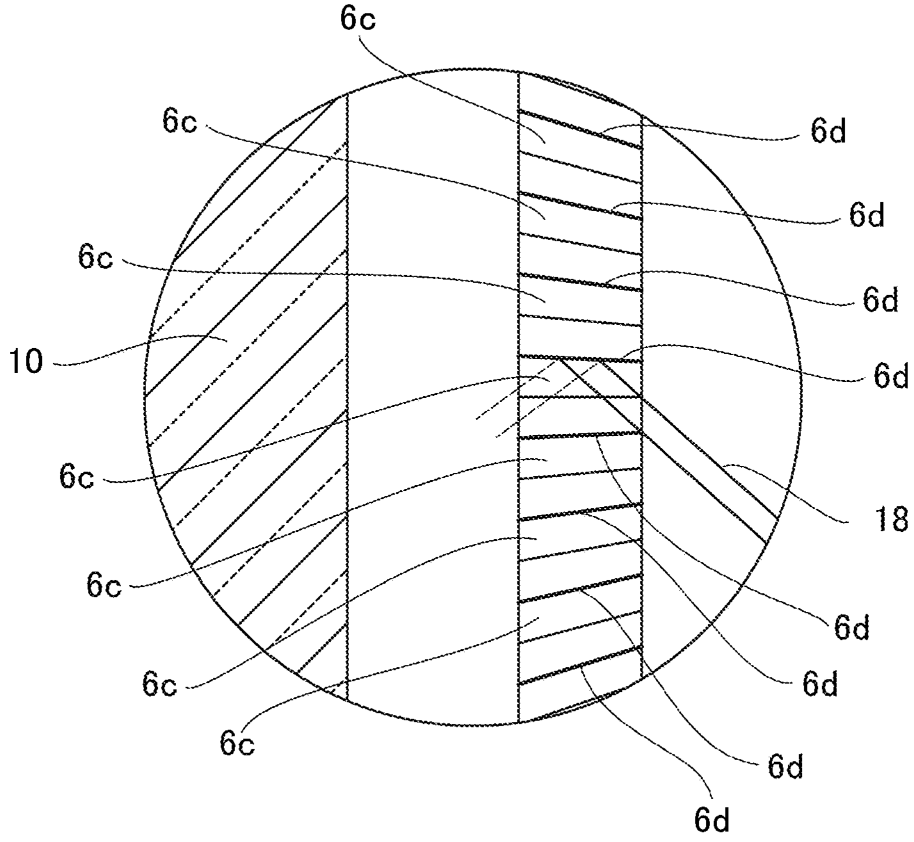
FIG. 6 is a detailed diagram illustrating a portion B of FIG. 5.

FIG. 5 is a sectional view taken along the line A-A of FIG. 2 and illustrates a relation between the head and eyeballs and the HMD 1 when the HMD 1 is used. FIG. 6 is a detailed diagram illustrating an expanded portion B of FIG. 5. The portion B of FIG. 5 is a partial portion facing the left eye of the user. As illustrated in FIG. 6, the plurality of opening portions 6*c* inside the angle selection type transmission element 6 are formed between a plurality of walls 6*d* adjacent to each other. That is, a space between two adjacent opening portions 6*c* is partitioned by the walls 6*d*.

In the present embodiment, the insides of the plurality of opening portions 6*c* are filled with a transparent solid that has a small refractive index difference from air inside the plurality of opening portions 6*c*. By filling the inside of the angle selection type transmission element 6 with the transparent solid that has a small refractive index difference from air inside the angle selection type transmission element 6, it is possible to prevent intrusion of dust into the plurality of opening portions 6*c*. Further, it is possible to prevent the walls 6*d* from being deformed by the external force. In the present embodiment, as the transparent solid that has the small refractive index difference from air, a porous transparent material that includes 90% or more of air is used, and a refractive index difference from air is equal to or less than 0.1. Therefore, there is little reflection from a boundary surface with air. Inside the plurality of opening portions 6*c*, there is little reflection from the surface of the transparent solid that has a small refractive index difference form air in any one of the first surface 6*a* on the eye side and the second surface 6*b* on the eyepiece lens system 10 side, and most of the light incident on the plurality of opening portions 6*c* from the outside is incident on the inside without being reflected.

An antireflection process is performed on the first surface 6*a*, the second surface 6*b*, and internal surfaces of the plurality of opening portions 6*c* (internal surfaces of the walls 6*d*) of the angle selection type transmission element 6. The angle selection type transmission element 6 can be generated using a 3D printer and the antireflection process can be implemented by performing antireflection coating.

When the HMD 1 illustrated in FIG. 5 is used, it is assumed that there is perfect front lighting, that is, light coming from a direction in which the user is oriented toward a light source (the sun or the like). In this case, most of the light reversely input to the angle selection type transmission element 6 and the eyepiece lens system 10 is blocked by the head of the user. However, when the user rotates her or his face by tens of angles sidewise from this state, light passing via the lateral sides of the face (light passing through a cross-hatching of FIG. 5) arrives at positions of the angle selection type transmission element 6 and the eyepiece lens system 10.

A region where there is a possibility of ghosting occurring due to light reversely input to the eyepiece lens system 10 is a cross-hatching of FIG. 5, as indicated by a line 17 binding a point 16 of FIG. 5 to a side of the head, in the case of the left eye. In the present embodiment, the plurality of opening portions 6*c* are provided from the eyepoint 13 to the eyepiece lens system 10. To cause light to arrive at the eyepiece lens system 10 located on a side more away from the user than the plurality of opening portions 6*c*, a light source is required to be located in a direction of holes of the opening portions 6*c*. The line 17 of FIG. 5 indicates a position at which a direction of the plurality of opening portions 6*c* is closest to a direction of rays of light and the reversely input light easily arrives at the eyepiece lens system 10.

In FIG. 6, the rays of light 18 represents light passing through the lateral sides of the head of the user. The rays of light 18 are internally incident on the inside from the holes of the plurality of opening portions 6*c* provided in the first surface 6*a* of the angle selection type transmission element 6. The light entering the insides of the plurality of opening portions 6*c* arrives at the walls 6*d*. However, since the antireflection process is performed on the walls 6*d*, reflected light attenuates. Therefore, even if the reflected light arrives at the eyepiece lens system 10, ghosting hardly occurs.

A thickness of the angle selection type transmission element 6 is denoted by t, an opening width of the opening portion 6*c* is denoted by w, and an incidence angle of unnecessary light is denoted by $\theta_0$. A condition that the unnecessary light does not directly arrive at the eyepiece lens system 10 is expressed in the following Expression (1):

$$t \geq w/\tan\theta_0 \quad (1),$$

where tan indicates a tangent and satisfies the condition of Expression (1) in the present embodiment.

Figure 7:
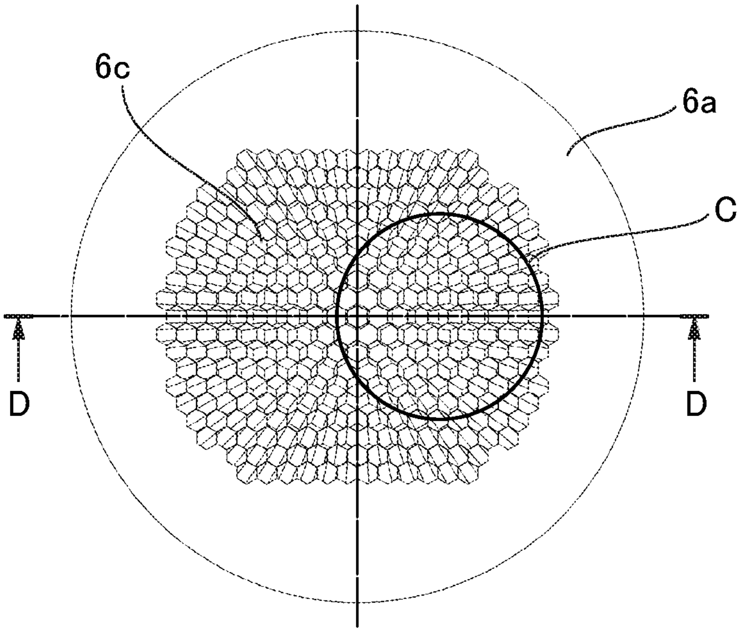
FIG. 7 is a diagram illustrating a first surface side of an angle selection type transmission element.
Figure 8:
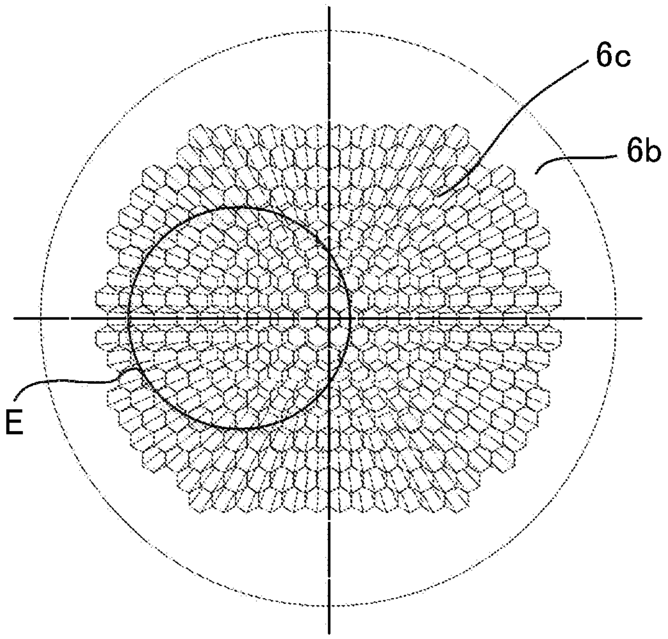
FIG. 8 is a diagram illustrating a second surface side of the angle selection type transmission element.
Figure 9:
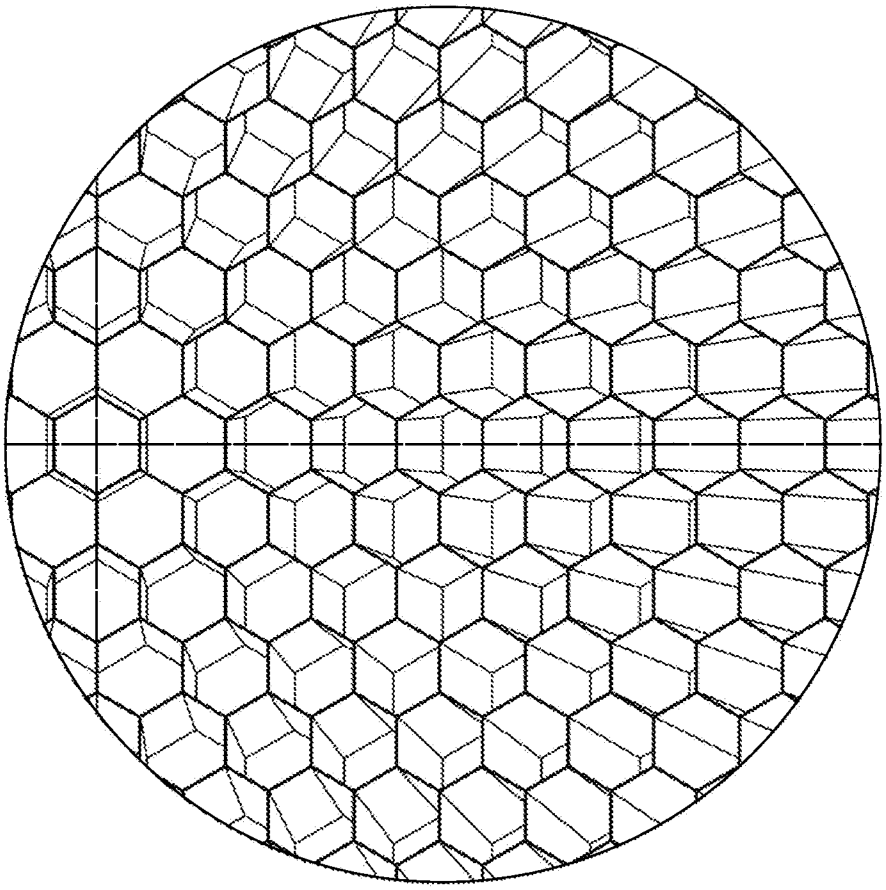
FIG. 9 is a detailed diagram illustrating a portion C of FIG. 7.
Figure 10:
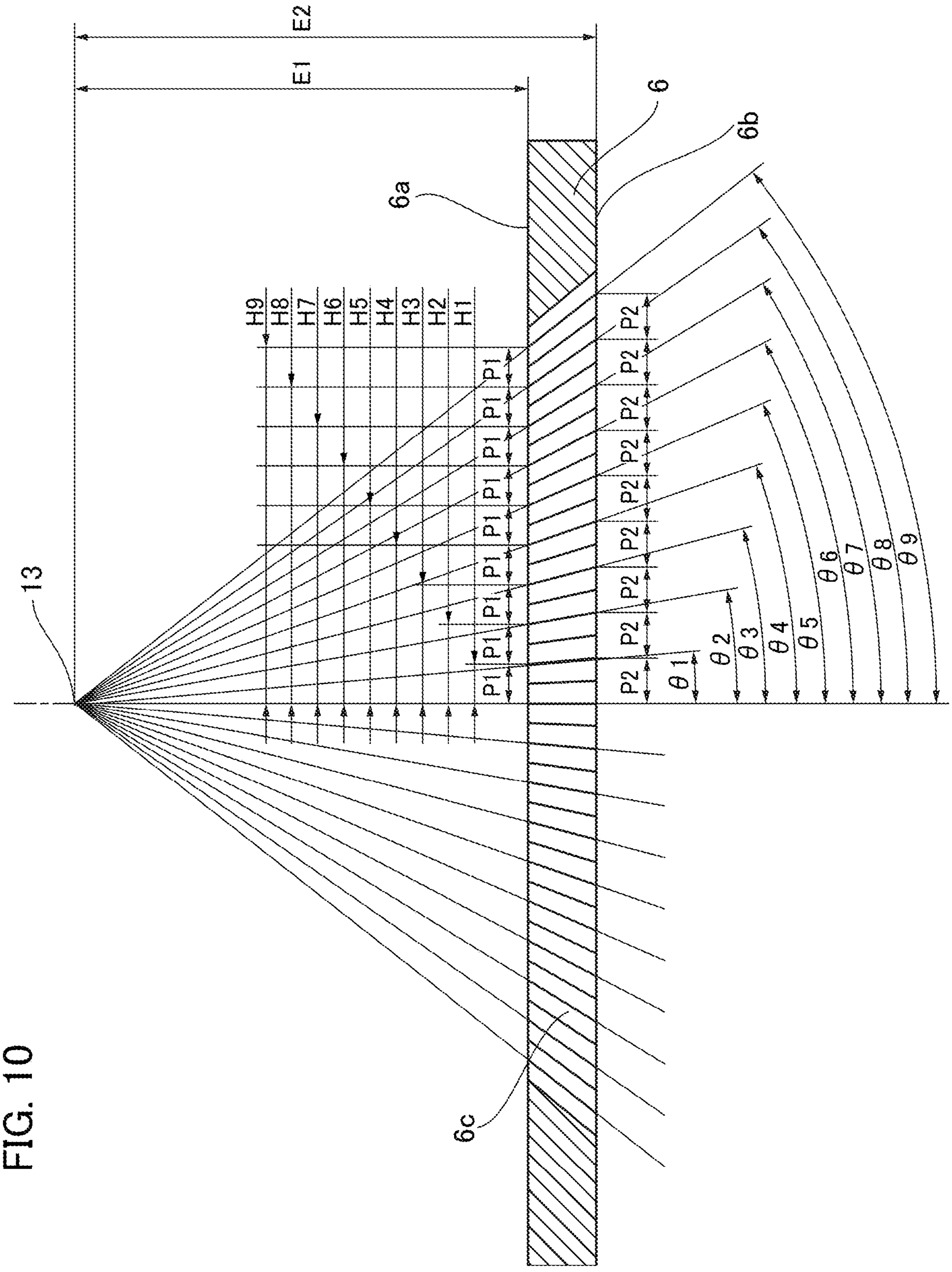
FIG. 10 is a sectional view taken along the line D-D of FIG. 7.
Figure 11:
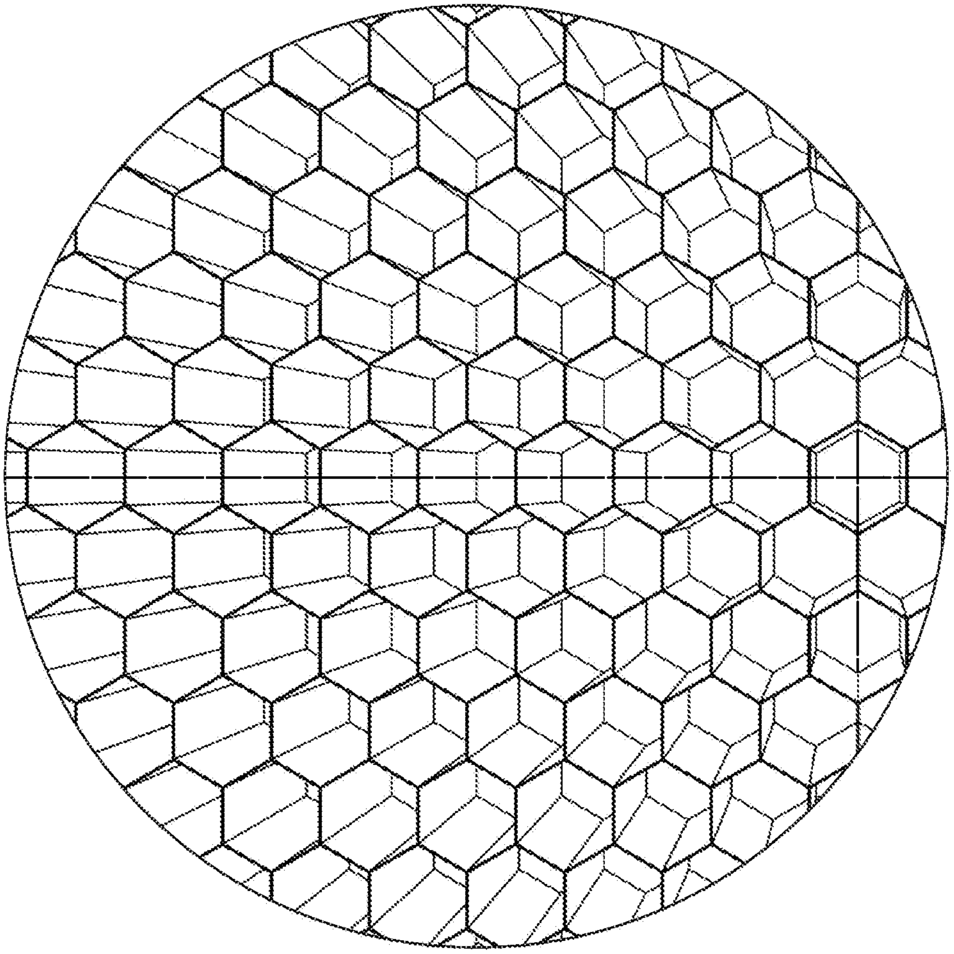
FIG. 11 is a detailed diagram illustrating a portion E of FIG. 8.

FIG. 7 is a diagram schematically illustrating the first surface 6*a* of the angle selection type transmission element 6. FIG. 8 is a diagram schematically illustrating the second surface 6*b* of the angle selection type transmission element 6. FIG. 9 is a detailed diagram illustrating an enlarged portion C of FIG. 7. FIG. 10 is a sectional view taken along the line D-D of FIG. 7. FIG. 11 is a detailed diagram illustrating an expanded portion E of FIG. 8.

As illustrated in FIGS. 7 to 9, the plurality of opening portions 6*c* provided in the angle selection type transmission element 6 are formed in a hexagonal shape in the second surface 6*b* on the entrance side of the rays of finder light and the first surface 6*a* on the exit side of the rays of finder light. In the embodiment, all openings in the hexagonal shape provided in the second surface 6*b* have the same shapes in the second surface 6*b*. All openings in the hexagonal shape provided in the first surface 6*a* have the same shape in the first surface 6*a*. A space of adjacent hexagonal shape is partitioned by the wall 6*d* and the inside of the opening portion 6*c* is filled with a transparent sold that has a small refractive index difference from air.

FIG. 10 (a sectional view along the line D-D of FIG. 7) illustrates directions of the plurality of opening portions 6*c*. The directions of the plurality of opening portions 6*c* are each set to be oriented in a direction of light oriented toward the eyepoint 13. That is, the plurality of opening portions 6*c* are formed radially 3-dimensionally centering on the eyepoint 13 which is a pre-decided point. A distance between the eyepoint 13 and the first surface 6*a* is denoted by E1 and a distance between the eyepoint 13 and the second surface 6*b* is denoted by E2. A pitch at which the plurality of opening portions 6*c* on the first surface 6*a* is denoted by P1.

The plurality of opening portions 6*c* are provided at an equal pitch and a distance from an optical axis center is denoted by Hi. On the right half plane of FIG. 10 on which the optical axis center is a standard, i in "Hi" indicates any natural number from 1 to 9.

$$H1 = P1$$
$$H2 = P1 \times 2$$
$$\vdots$$
$$H8 = P1 \times 8$$
$$H9 = P1 \times 9$$

That is, a relation of "Hi=P1×I" is satisfied.

When the optical axis center serves as a standard, an angle with each of straight lines binding the eyepoint 13 with the plurality of opening portions 6*c* is denoted by θi. Here, I of "θi" is any natural number from 1 to 9.

$$\theta 1 = \tan^{-1}(H1/E1)$$
$$\theta 2 = \tan^{-1}(H2/E1)$$
$$\vdots$$
$$\theta 8 = \tan^{-1}(H8/E1)$$
$$\theta 9 = \tan^{-1}(H9/E1)$$

$\tan^{-1}$ is an arctangent function and indicates a relation of "$\theta i=\tan^{-1}$ (Hi/E1).

A pitch P2 between the plurality of opening portions 6*c* on the second surface 6*b* is expressed in the following Expression (2).

$$P2 = E2 \times \tan\theta 1 \quad (2)$$

In FIG. 10, the right half plane has on which the optical axis center serves as the standard has been described. However, because of a symmetric configuration with respect to the optical axis, the foregoing relation is also established for the left half plane.

When the position of the eyepoint 13 serves as a standard and the eyepiece lens system 10 is seen from an eye of the user, the eyepiece lens system 10 is seen through the plurality of opening portions 6*c*. Since the walls 6*d* are substantially parallel to the direction of light arriving at the eye of the user, most of the light cannot be visually recognized. When there is the eye of the user in the eyepoint 13, the first surface 6*a* comes to close to the eye and visual observation is not focused. Since the thickness of the wall 6*d* is thin, most of a planar portion of an entrance of the wall 6*d* cannot be visually recognized. As illustrated in FIGS. 9 and 11, the thickness of the wall 6*d* between the opening portions is formed equally on the eye side and the lens side in the present embodiment.

The user can visually recognize display information from only the vicinity of the eyepoint 13, and it is necessary to fix the position of the eye to the vicinity of the eyepoint 13. In the present embodiment, locating of the eye at the position of the eyepoint 13 is realized by fixing a relative positional relation between the head of the user and the HMD 1 by the head mount unit 5.

In the present embodiment, the angle selection type transmission element 6 disposed on the optical path of the finder includes the plurality of opening portions 6*c* limiting a passage direction of a light flux within a predetermined range. An angle range in which the passage direction of finder light in at least two regions is different (see FIG. 10). That is, a first angle (a lens optical axis direction angle) at which a passage direction at a center position serving as a first region with respect to the finder light flux is different from a second angle (θ1) at which a passage direction at a peripheral position serving as a second region with respect to the light flux is limited. A limiter for a light passage direction is configured by the plurality of radial opening portions 6*c* oriented from the eyepoint 13 to the eyepiece lens system 10. In the present embodiment, ten types of light passage directions are further provided, including eight regions of θ2 to θ9. Accordingly, light from directions other than the eyepoint can be limited and blocked.

According to the present embodiment, it is possible to provide the angle selection type transmission element capable of allowing eyepiece observation to be performed without involving vignetting of a peripheral unit while reducing ghosting caused by light from the rear side of the user.

Modified Examples of First Embodiment

Figure 12A:
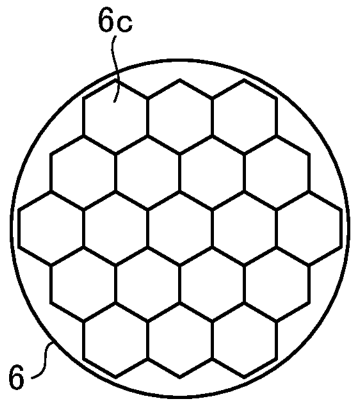
FIGS. 12A to 12E are diagrams illustrating shape examples of opening portions provided in the angle selection type transmission element.
Figure 12B:
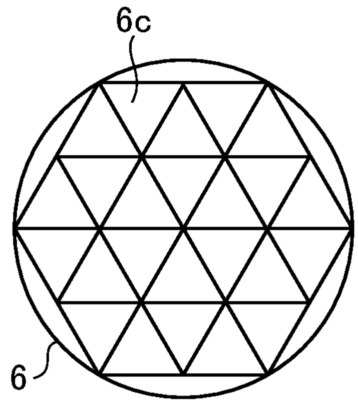
Figure 12C:
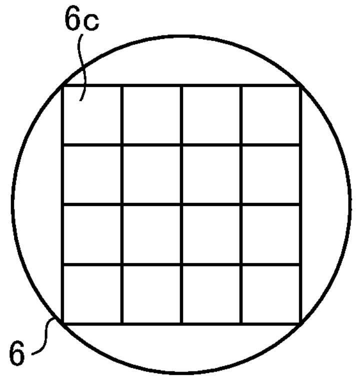

Modified examples of the first embodiment will be described with reference to FIGS. 12A to 18. FIGS. 12A to 12E are diagrams schematically illustrating the opening portions 6*c* provided in the first surface 6*a* and the second surface 6*b* of the angle selection type transmission element 6. FIG. 12A illustrates a case in which the plurality of opening portions 6*c* provided in the first surface 6*a* and the second surface 6*b* of the angle selection type transmission element 6 are configured in a regular hexagon, as described in the first embodiment. In this case, a structure in which an opening ratio is the largest and flexibility (impact absorbing power) is the highest is achieved.

In the modified example, an example of the shape of the opening portions 6*c* will be described. As a one type of regular polygon with which a plane can be filled, there is a regular triangle illustrated in FIG. 12B and a regular tetragon (a regular square) illustrated in FIG. 12C. The three types of shapes are called a regular tessellation. Of these types of shapes, the regular triangle has the most excellent strength, and the shape of the opening portions 6*c* can be selected in accordance with a use.

Figure 12D:
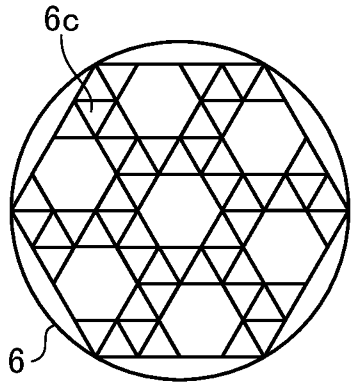
Figure 12E:
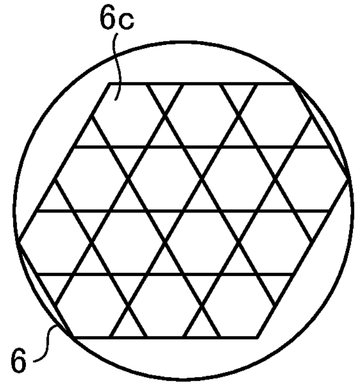

The plurality of opening portions 6*c* provided in the first surface 6*a* and the second surface 6*b* of the angle selection type transmission element 6 can be configured in only a plurality of regular polygons. These shapes are eight types of shapes called an Archimedean regular tessellation in which vertex shapes with which a plane can be filled are similar. Of these shapes, there are two types of combinations of a regular triangle and a regular hexagon. FIGS. 12D and 12E illustrate examples of the combinations of a regular triangle and a regular hexagon. With a configuration in which a plurality of regular polygons are used, advantages of the shapes can be combined to generate the angle selection type transmission element 6. Additionally, in a shape in which plane filling is possible, there is plane filling by polygons, aperiodic filling, or filling with a center (spiral filling, radial filling, or the like). This can also be applied to the shape of the opening portion 6*c* in accordance with a use.

Figure 13A:
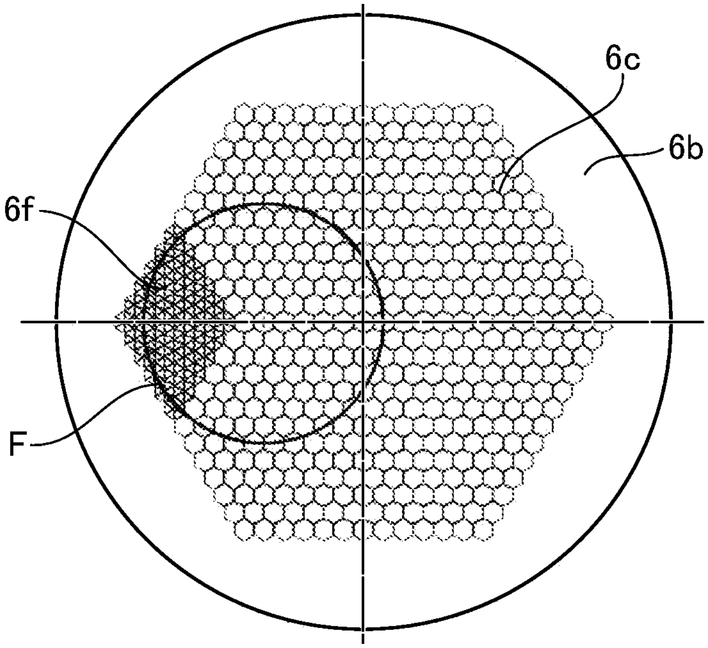
FIGS. 13A and 13B are diagrams illustrating a second surface side of an angle selection type transmission element according to a modified example.
Figure 13B:
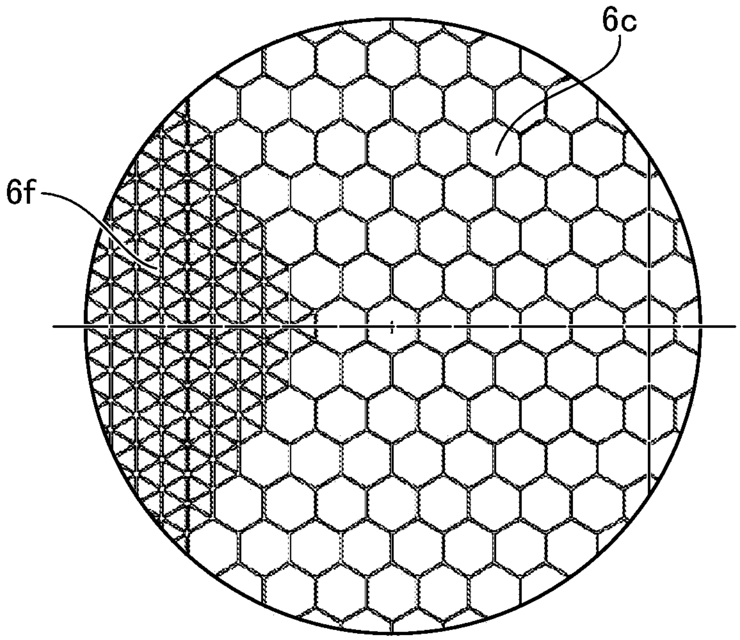

FIGS. 13A and 13B illustrate modified examples in which a plurality of regions with different openings are provided. FIG. 13A illustrates the second surface 6*b* of the angle selection type transmission element 6 and FIG. 13B is a detailed diagram illustrating a portion F in FIG. 13A. A configuration in which the opening portions of the angle selection type transmission element 6 are partially changed is illustrated. By mixing portions 6*c* with a broad opening and portions 6*f* with a narrow opening, an improvement in an opening ratio and a reduction in unnecessary light are easily compatible.

Figure 14:
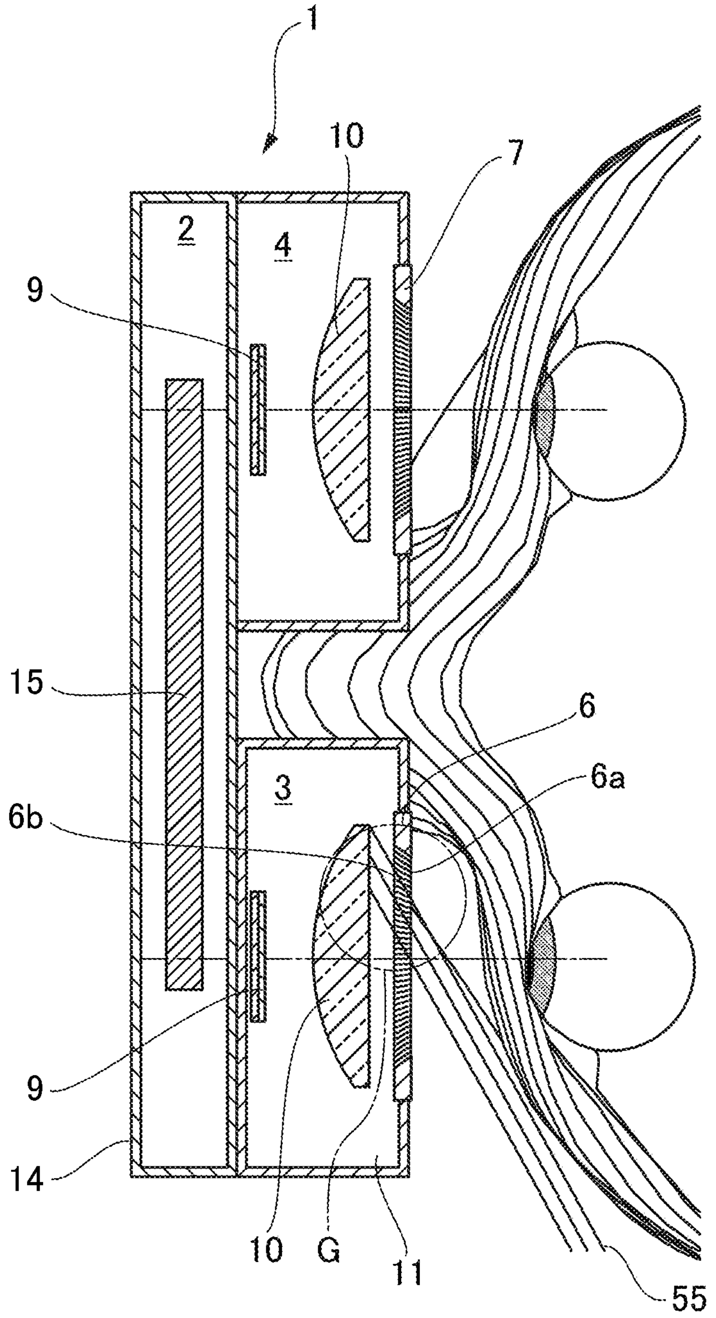
FIG. 14 is a sectional view illustrating an optical path different from that of FIG. 5 according to a modified example.
Figure 15:
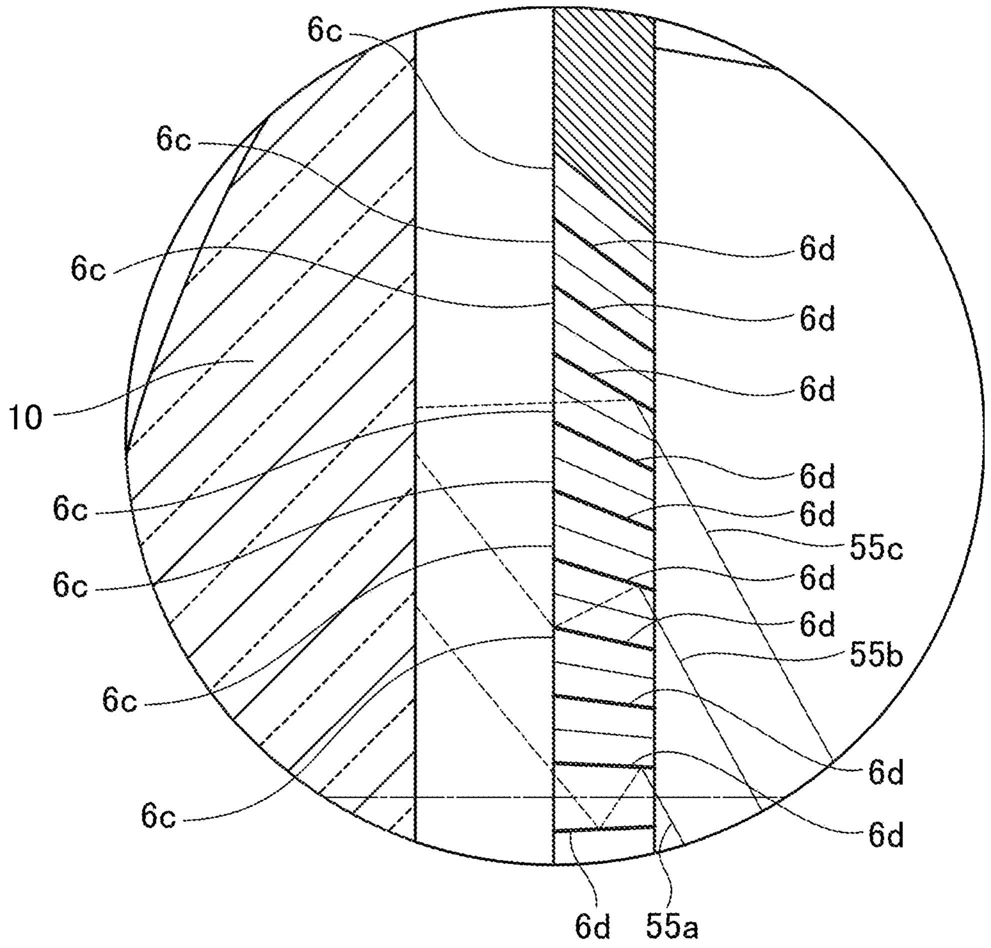
FIG. 15 is a detailed diagram illustrating a portion G of FIG. 14.

Light passing through the lateral sides of the head of the user will be described with reference to FIGS. 14 and 15. FIG. 14 is a sectional view illustrating an optical path different from that of FIG. 5. FIG. 15 is a detailed diagram illustrating a portion G in FIG. 14. Rays of light 55 in FIG. 14 and rays of light 55*a*, 55*b*, and 55*c* in FIG. 15 indicate light passing through the lateral sides of the head of the user. Light entering the insides of the plurality of opening portions 6*c* is reflected from the walls 6*d*, but the number of reflections decreases with an approach to the center of the head. Therefore, when reflected light does not sufficiently attenuate, it is possible to uniformly reduce light which is a cause of ghosting.

Figure 16:
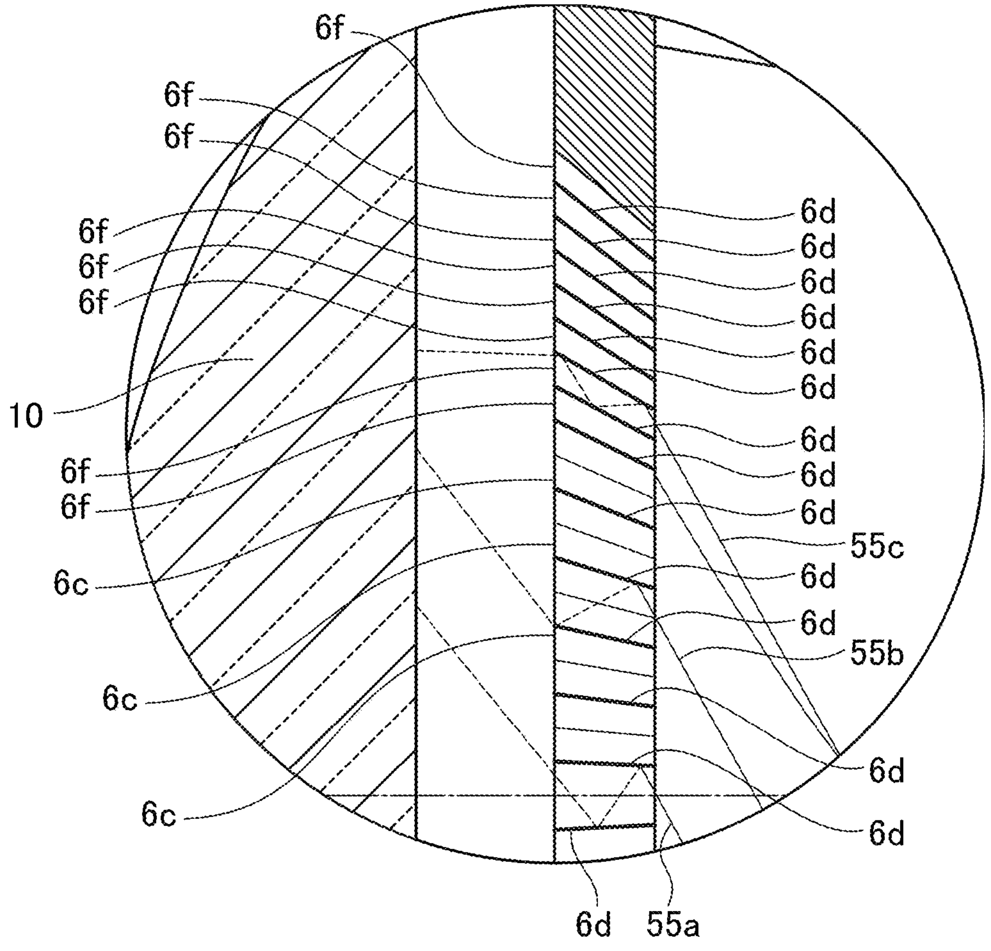
FIG. 16 is a detailed diagram illustrating an angle selection type transmission element according to a modified example.

FIG. 16 is a detailed diagram according to a modified example. FIG. 16 illustrates an optical path when opening portions 6*f* are provided on a central side of the head. An opening of the opening portion 6*f* in a region oriented to the center of two eyes of the user is narrower than an opening of the opening portion in a region away from the center of two eyes. In the modified example, when the opening is narrowed, the number of times the rays of light are reflected increases, and thus the light easily attenuates. Since the opening portions 6*c* with a broad opening are provided in the center of the angle selection type transmission element 6, appearance of the eyepiece lens system 10 is not damaged.

Figure 17:
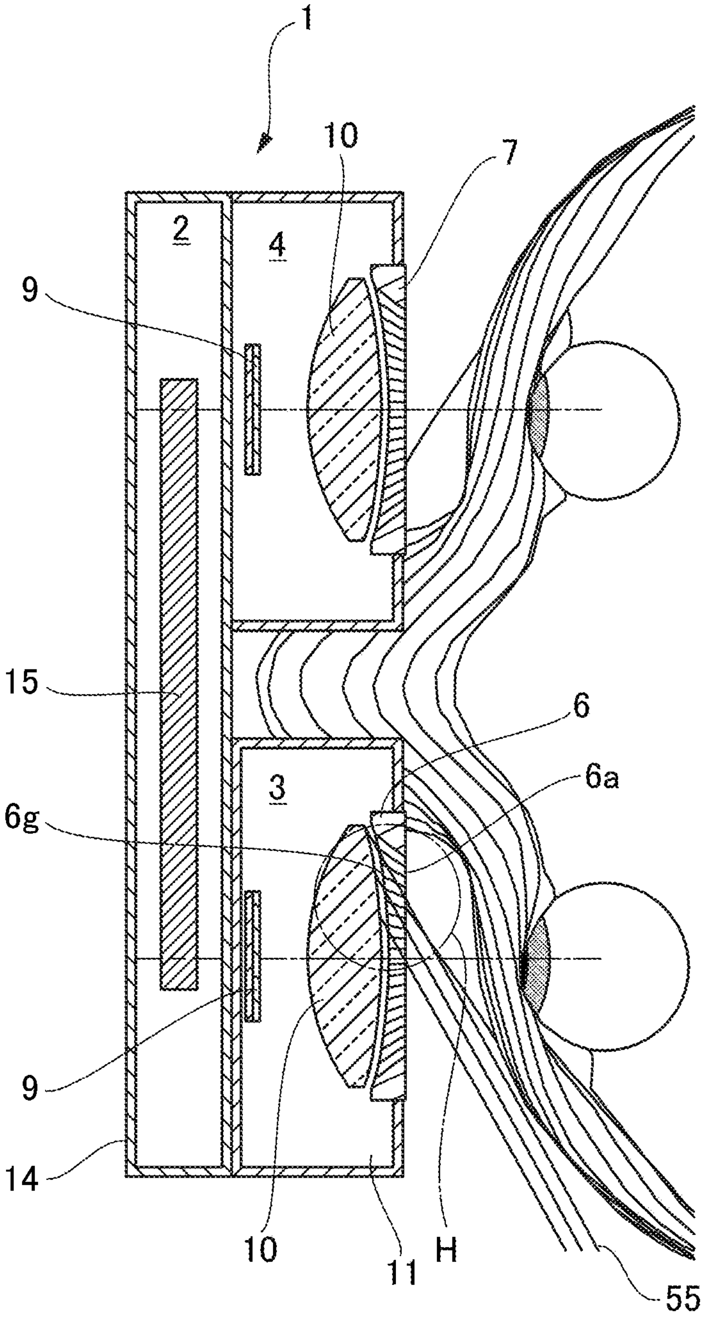
FIG. 17 is a sectional view illustrating an optical path different from that of FIG. 5 according to a modified example.
Figure 18:
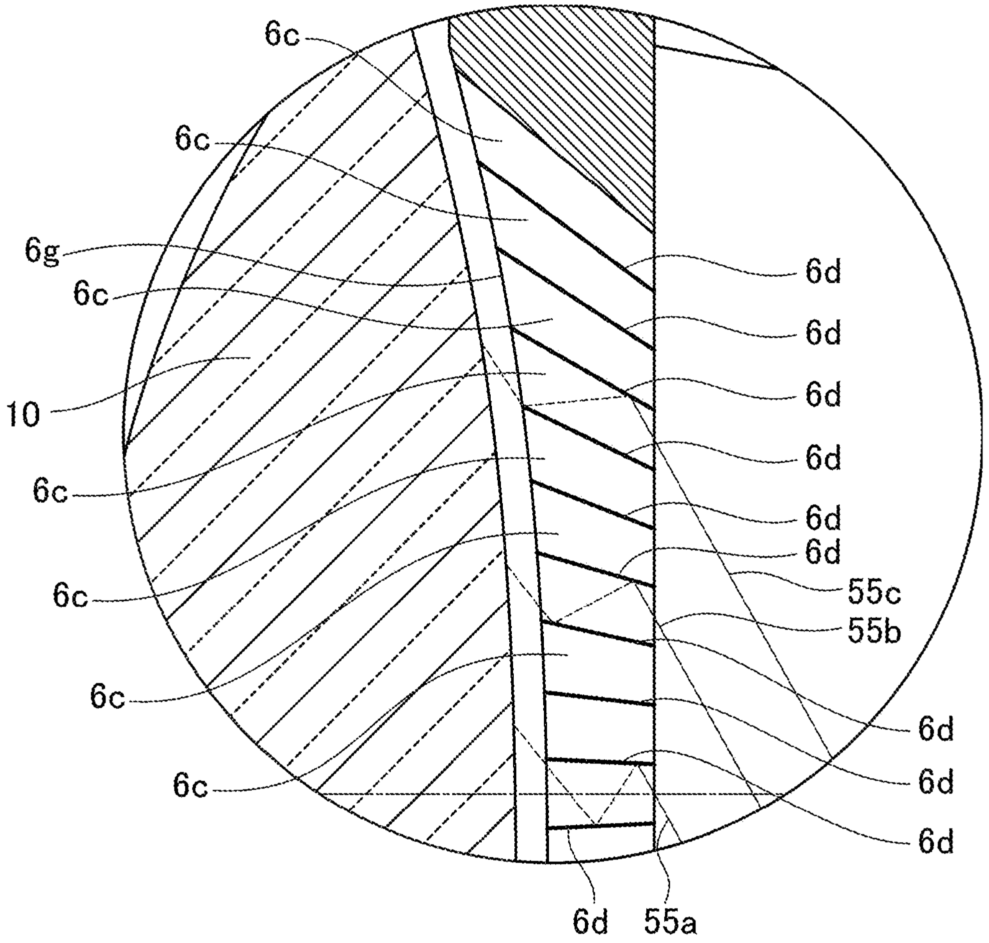
FIG. 18 is a detailed diagram illustrating a portion H of FIG. 17.

Instead of narrowing the opening, there is a method of partially changing a member thickness of the angle selection type transmission element 6. Light passing through the lateral sides of the head of the user will be described with reference to FIGS. 17 and 18. FIG. 17 is a sectional view illustrating an optical path different from that of FIG. 5. FIG. 18 is a detailed diagram illustrating a portion H in FIG. 17. The rays of light 55 and the rays of light 55*a*, 55*b*, and 55*c* have been described in FIGS. 14 and 15. A pipe length of the opening portions in a region oriented to the center of two eyes of the user is longer than a pipe length of the opening portions in a region away from the center of two eyes.

In the modified example illustrated in FIGS. 17 and 18, a surface 6*g* which is an entrance side of the rays of finder light of the angle selection type transmission element 6 is formed in a curved shape along a curved surface of the eyepiece lens system 10. On the center side of the head of the user, the pipe length of the opening portions 6*c* extends, and thus the number of times the rays of light is reflected increases, and thus the light easily attenuates.

Second Embodiment

Next, a second embodiment of the present invention will be described. In the present embodiment, an example of a case in which an angle selection type transmission element is generated with a stacked structure of metal plates will be described. In the present embodiment, detailed description of the same factors as those of the first embodiment will be omitted and differences will be mainly described. The method of omitting the description is the same in embodiments to be described below.

Figure 19:
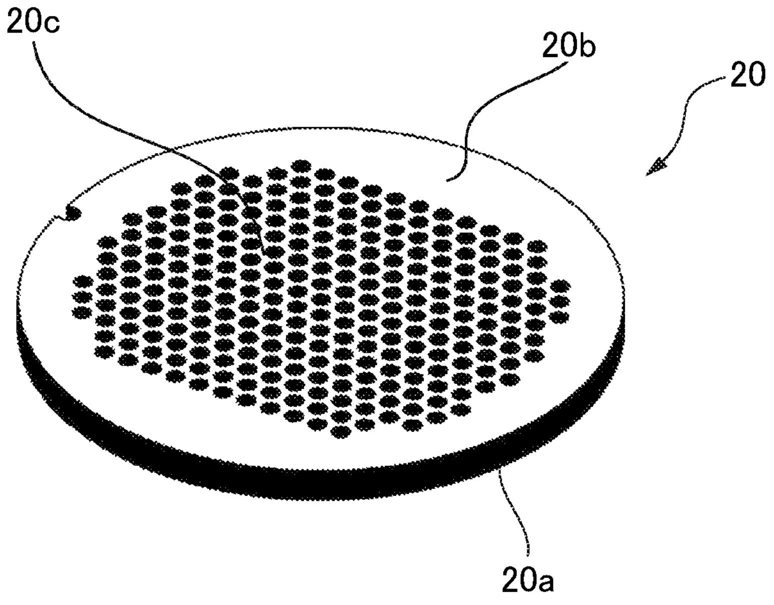
FIG. 19 is an external view according to a second embodiment of the present invention.

FIG. 19 is an external view illustrating an angle selection type transmission element 20 formed by stacking a plurality of metal plates. A surface illustrated in FIG. 19 is a surface 20*b* on the eyepiece lens system side and an opposite surface is a surface 20*a* on the eye side. In the angle selection type transmission element 20, a plurality of opening portions 20*c* are provided as in the first embodiment.

Figure 20:
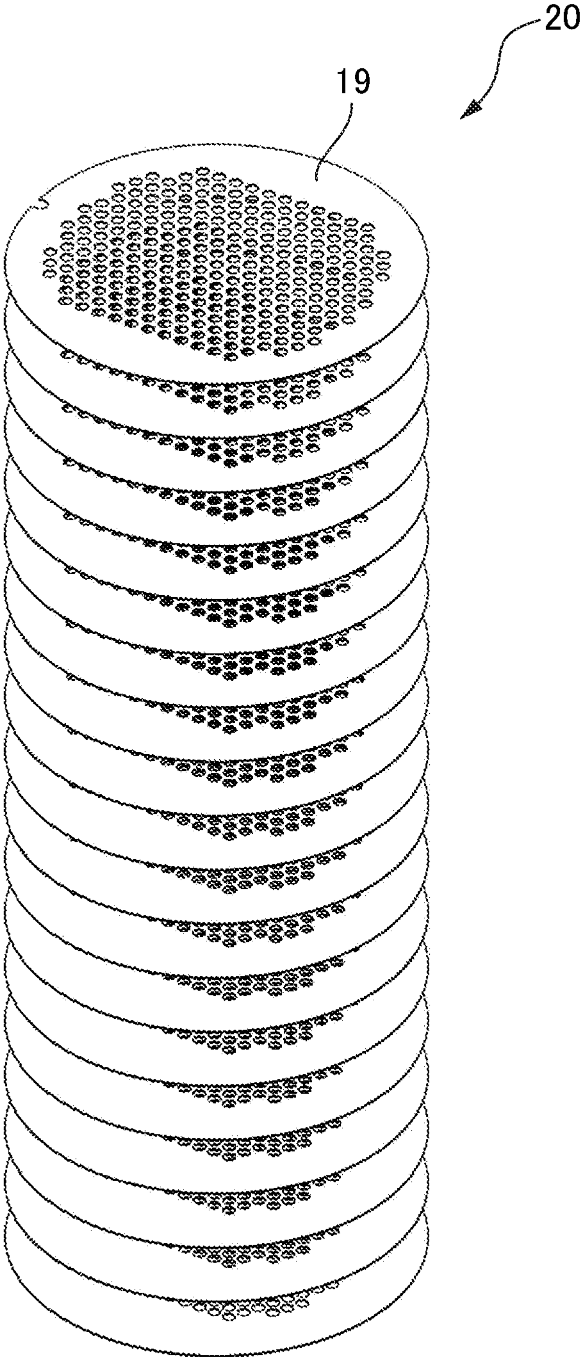
FIG. 20 is an exploded perspective view illustrating a configuration of the angle selection type transmission element of FIG. 19.

FIG. 20 is an exploded perspective view illustrating the angle selection type transmission element 20. The angle selection type transmission element 20 is configured by nineteen aluminum plates 19. In the aluminum plate 19, a plurality of opening portions 20*c* are provided by forming round holes by etching. Diameters of the round holes are equal in the nineteen aluminum plates, but pitches thereof are different.

Figure 21A:
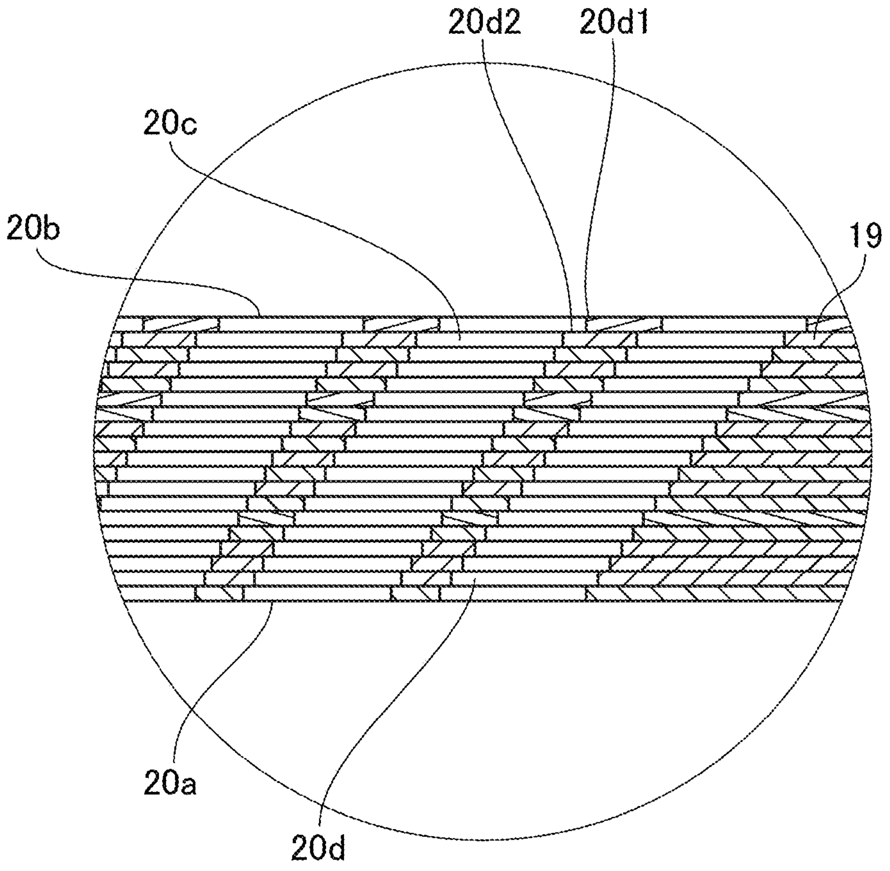
FIGS. 21A and 21B are detailed diagrams illustrating walls of the angle selection type transmission element in a state in which metal plates are stacked.

FIG. 21A is a partial sectional view illustrating a state in which the plurality of aluminum plates 19 are stacked. The upper side of FIG. 21A is an eyepiece lens system side and the lower side of FIG. 14 is an eye side. The opening portions 20*c* in the stacked state are oriented to the position of the eyepoint as in the first embodiment. Sizes of opening diameters of the plurality of opening portions 20*c* provided in the aluminum plate 19 are different for each of the stacked aluminum plates. The opening portions 20*a* on the eye side are the smallest and the opening portions 20*b* on the eyepiece lens system side are the largest. Regions where a passage direction of a light flux are formed such that central positions of opening diameters of the opening portions 20*c* provided in the aluminum plate 19 are different before and after the stacked aluminum plates.

In the present embodiment, since the opening diameters of the plurality of opening portions 20*c* provided in one aluminum plate 19 are uniform and the pitches are different for each of the stacked aluminum plates, widths of the walls between the holes vary. The metal plates are integrated by diffusion bonding after being stacked. Thereafter, an entire antireflection process is performed by performing matting alumite.

The plurality of opening portions 20*c* limiting the passage direction of the light flux are partitioned by the walls 20*d* and are configured by wall surfaces in two or more directions which are parallel to the passage direction of the light flux. Specific description will be made with reference to FIGS. 21A and 21B.

Figure 21B:
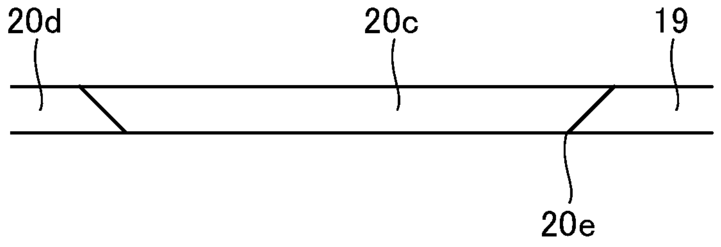

As illustrated in the detailed diagram of the walls of the angle selection type transmission element illustrated in FIG. 21A, the walls 20*d* are configured by wall surfaces 20*d*1 and 20*d*2. FIG. 21B is a sectional view illustrating one aluminum plate 19 among the plurality of stacked aluminum plates. In the opening portion 20*c* provided in the aluminum plate 19, a sharp edge-shaped portion 20*e* may be provided. An attenuation amount of reflected light can be large through the antireflection process performed on the sharp edge-shaped portion 20*e* and the wall 20*d* provided in the aluminum plate 19.

In the present embodiment, intrusion of dust is prevented by providing glass (not illustrated) to one side (eye side) of the angle selection type transmission element 20. Antireflection coating is performed on both surfaces of the glass. According to the present embodiment, in the configuration in which the plurality of metal plates are stacked, it is possible to implement the angle selection type transmission element obtaining similar advantageous effects to those of the foregoing embodiment.

As a technique for implements the pitches of the holes in another form to adapt the opening portions in the optical path in the metal plates stacked in the optical axis direction, the opening diameters of the plurality of opening portions provided in one metal plate are set to be uniform and intervals between the holes are set to be different. As the advantageous effect, for example, it is easy to process the metal plates and shield light which is a cause of ghosting.

On the other hand, as another technique for forming the openings adapted to the optical path, the opening diameters of the plurality of opening portions 20*c* are set to be different, as described above. At this time, it is rational that the metal plate closer to the eyepiece lens system has a larger opening size and the metal plate closer to the eyepoint has a smaller opening size along the optical path in which light diffusing in an exit pupil of the eyepiece lens system is formed as an image at the eyepoint. In particular, the shape is preferably a pyramid having the eyepoint as a vertex.

Figure 22:
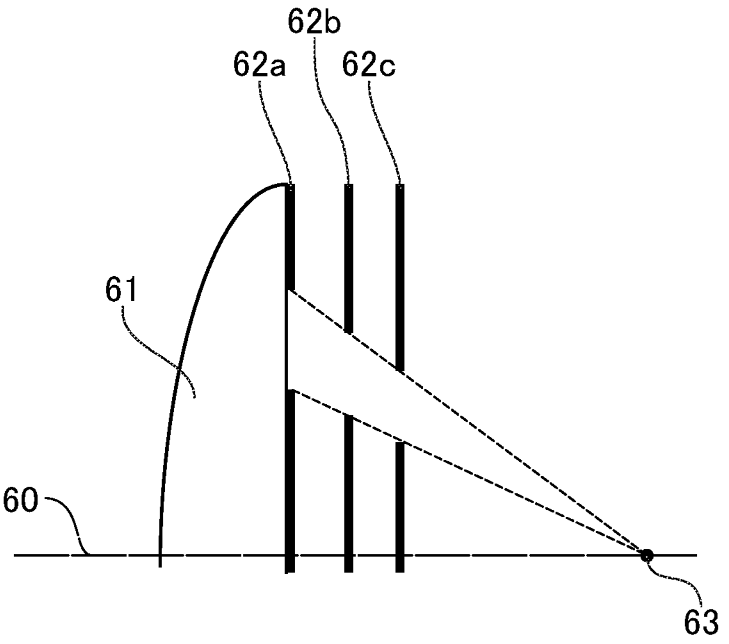
FIG. 22 is a diagram illustrating a relation between an opening portion and an eyepoint of the angle selection type transmission element.

FIG. 22 is a schematic view illustrating a relation between the eyepoint and the opening portion of the angle selection type transmission element. As described above, the opening portions of the plurality of metal plates when the openings are provided as pyramids having the eyepoint as a vertex are exemplified. FIG. 22 illustrates an optical axis 60, an eyepiece lens 61 closest to the eye side, metal plates 62*a* to 62*c* for shielding light, and a point 63 serving as an eyepoint. The opening portions of the metal plates 62*a* to 62*c* may be provided in a pyramid shape having the point 63 serving as the eyepoint 63, as indicated by a dotted line.

Incidentally, in the form illustrated in FIG. 22, an eye box which is a visual field region where an appropriate image is seen becomes small, and there is a possibility of vignetting or the like of an image occurring even if the position of the eye slightly deviates from the eyepoint. In such a situation, in the metal plate close to the eyepoint, it is effective to expand the opening from a shape along the pyramid. An advantageous effect of expanding the eye box is expected by enlarging an opening expansion amount from the pyramid in the metal plate close to the eyepoint. The same applies to a case in which a metal plate (mask member) is provided with a gap as in a fourth embodiment to be described.

Figure 23A:
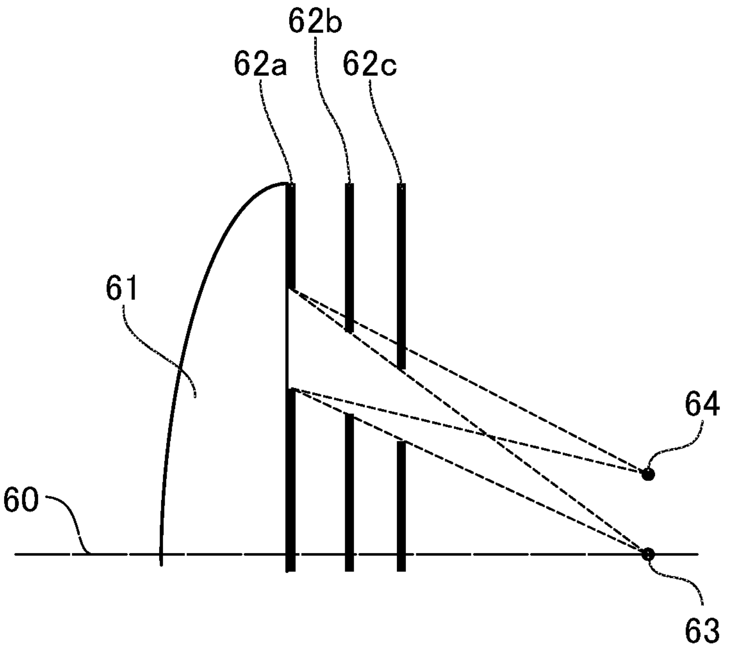
FIGS. 23A and 23B are diagrams illustrating a relation between an opening expansion amount and a state in which a position of the eyepoint is moved.
Figure 23B:
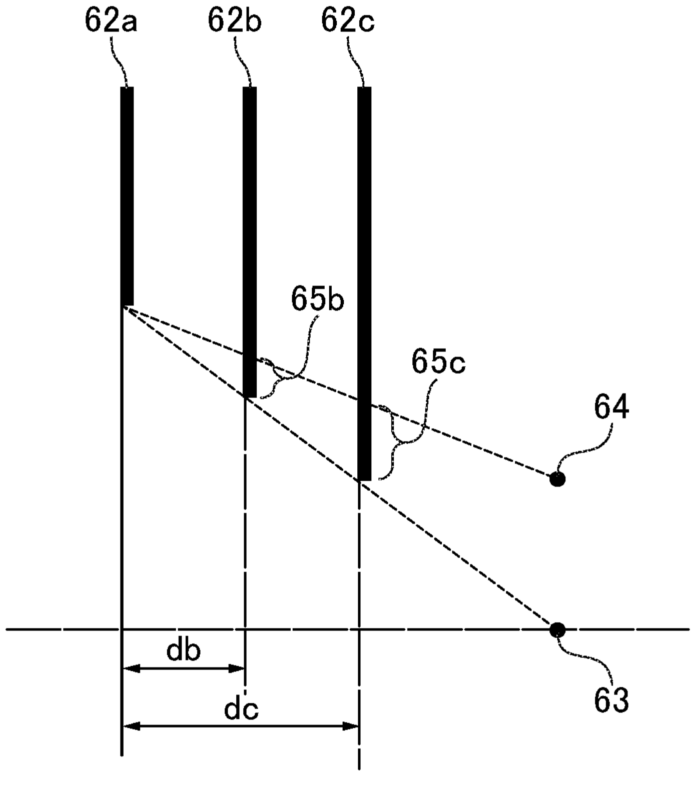

FIGS. 23A and 23B are diagrams illustrating a state in which the position of the eyepoint is moved with respect to FIG. 22. FIG. 23A is a diagram illustrating an example of an opening expansion region of a metal plate close to the eyepoint to expand the eye box. FIG. 23B is an enlarged view illustrating an opening expansion region of interest. A point 64 is a point corresponding to the eyepoint of the eye box when the eye box is expanded. As indicated by a dotted line, a line on a display region may hamper opening from the position of the eyepoint of the point 64 and vignetting may occur in an image. Accordingly, by expanding the opening in portions corresponding to regions 65*b* and 65*c*, it is possible to inhibit occurrence of vignetting from the position of the eyepoint of the point 64 and observe an appropriate image. Accordingly, since an image appropriately can be observed not only at the position of the point 63 but also at the position of the point 64, it is possible to expand the eye box.

An opening expansion amount will be described with reference to FIG. 23B. It is rational to expand the opening expansion amount in proportion to a distance between the eyepiece lens and the mask member (the metal plate). That is, distances between the eyepiece lens surface and the metal plates 62*b* and 62*c* are denoted by db and dc. An opening is expanded as "opening expansion amount=k×db corresponding to region 65*b*" and "opening expansion amount=k×dc corresponding to region 65*c*" by using an appropriate proportion coefficient k. Accordingly, an optical path binding an image of an eyepiece lens position and the eyepoint (the point 64) at the position of the eye box can be guaranteed and a good image with no vignetting can also be obtained at the position of the eyepoint indicated by the point 64. The configuration in which the opening expansion amount is proportional to the distance from the eyepiece lens surface has been described in FIG. 23B, but the present invention is not limited to this example. An opening of the opening portion included on the eyepoint side by the plurality of plates or the mask member may be expanded with respect to a line binding the opening of the opening portion included in the mask member or the plate closest to the eyepiece lens system with the eyepoint. By eliminating portions corresponding to the regions 65_b_ and 65_c_ in at least some of the openings included in three or more plates or mask members, it is possible to guarantee the sufficient eye box.

Third Embodiment

A third embodiment of the present invention will be described with reference to FIGS. 24 and 25. An angle selection type transmission element according to the present embodiment is configured using a plurality of types of louver films.

Figure 24:
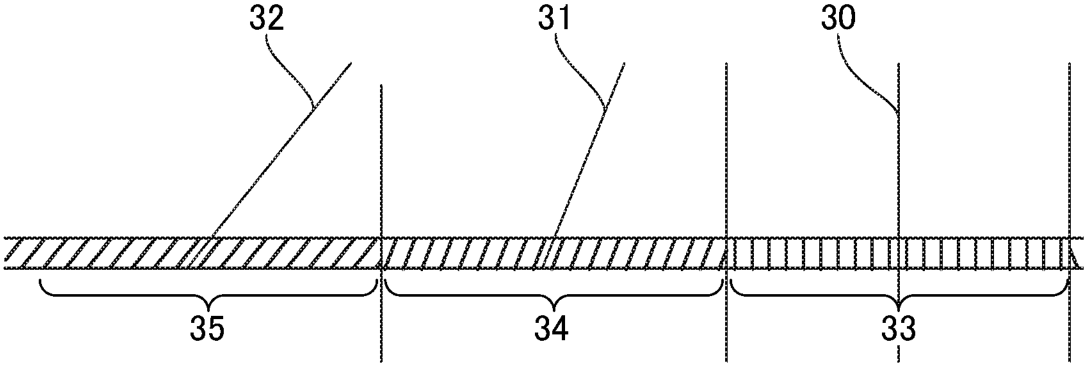
FIG. 24 is a diagram according to a third embodiment of the present invention.

FIG. 24 is a configuration diagram schematically illustrating an example in which an angle selection type transmission element is implemented in combination of a plurality of types of louver films. The louver film has a configuration in which plate-shaped opaque portions are provided inside a transparent film and a passage direction of light can be controlled.

As illustrated in FIG. 24, the louver film included in the angle selection type transmission element according to the present embodiment is divided into a plurality of regions 33 to 35 centering on the finder optical axis. An angle of a ray of light 30 parallel to the finder optical axis, that is, a first angle, is defined as zero. A ray of light 31 is light at a second angle which is an angle inclined with respect to the finder optical axis and a ray of light 32 is light at a third angle. The third angle is assumed to be greater than the second angle.

In the example illustrated in FIG. 24, a first region 33 is parallel to the finder optical axis (the first angle) and has an opaque portion extending in a depth direction (a direction perpendicular to the sheet surface) in FIG. 24. A second region 34 is parallel to the second angle and has an opaque portion extending in the depth direction of FIG. 24. A third region 35 is parallel to the third angle and has an opaque portion extending in the depth direction of FIG. 24.

Figure 25:
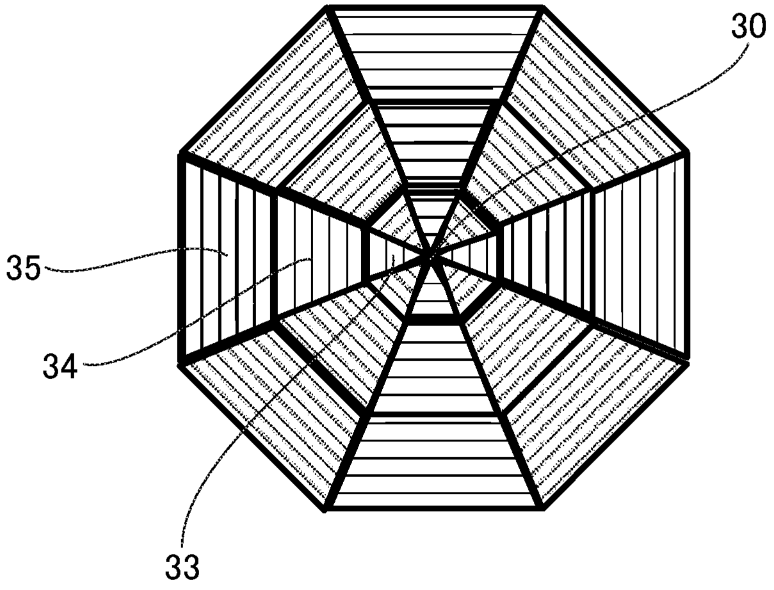
FIG. 25 is a plan view illustrating a disposition example of a film of FIG. 24.

FIG. 25 is a diagram illustrating disposition of the configuration of FIG. 24 in a planar direction and is a schematic view when viewed in a direction along the finder optical axis. In the present embodiment, films are provided in eight regions divided in a rotational direction centering on the finder optical axis. The shape of the first region 33 closest to the finder optical axis is substantially regular octagonal and the second region 34 adjacent to the outside is configured by eight divided regions. Similarly, the third region 35 adjacent to the outside of the second region 34 is configured by eight divided regions. Each region illustrated in FIG. 25 is provided to be rotationally symmetric centering on the finder optical axis. The dividing method illustrated in the present embodiment is exemplary and the number of divisions can be set to any number.

According to the present embodiment, by stacking the opaque films and the transparent films and combining the plurality of types of louver films generated in accordance with a method of changing a light cutting direction, it is possible to configure the angle selection type transmission element similar to that in the foregoing embodiments.

Fourth Embodiment

A fourth embodiment of the present invention will be described with reference to FIGS. 26 and 27. In the present embodiment, an example of an angle selection type transmission element that has a configuration in which a plurality of mask members (metal plates) are provided at predetermined intervals will be described.

Figure 26:
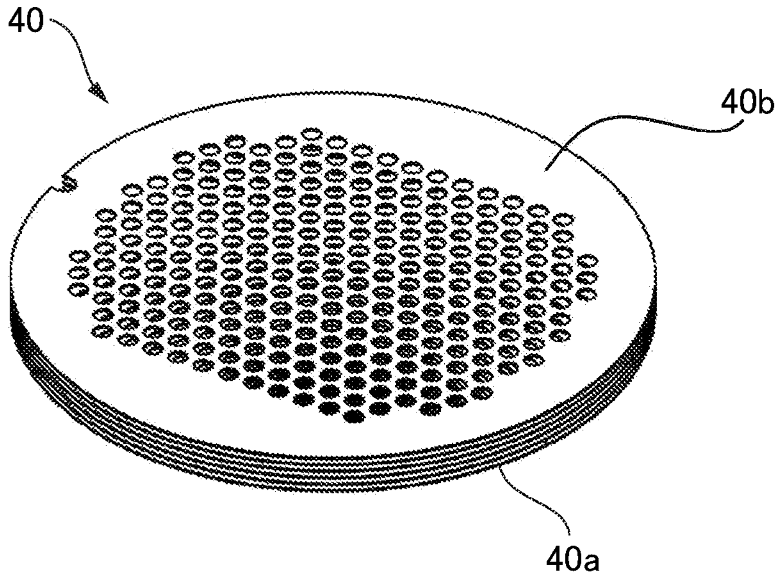
FIG. 26 is an external view according to a fourth embodiment of the present invention.

FIG. 26 is a diagram illustrating a separately stacked angle selection type transmission element 40. A surface seen in FIG. 26 is a surface 40_b_ on the eyepiece lens system side and an opposite surface is a surface 40_a_ on the eye side. The transmission element 40 is implemented by intermittently providing the plurality of metal plates described in the second embodiment.

Figure 27:
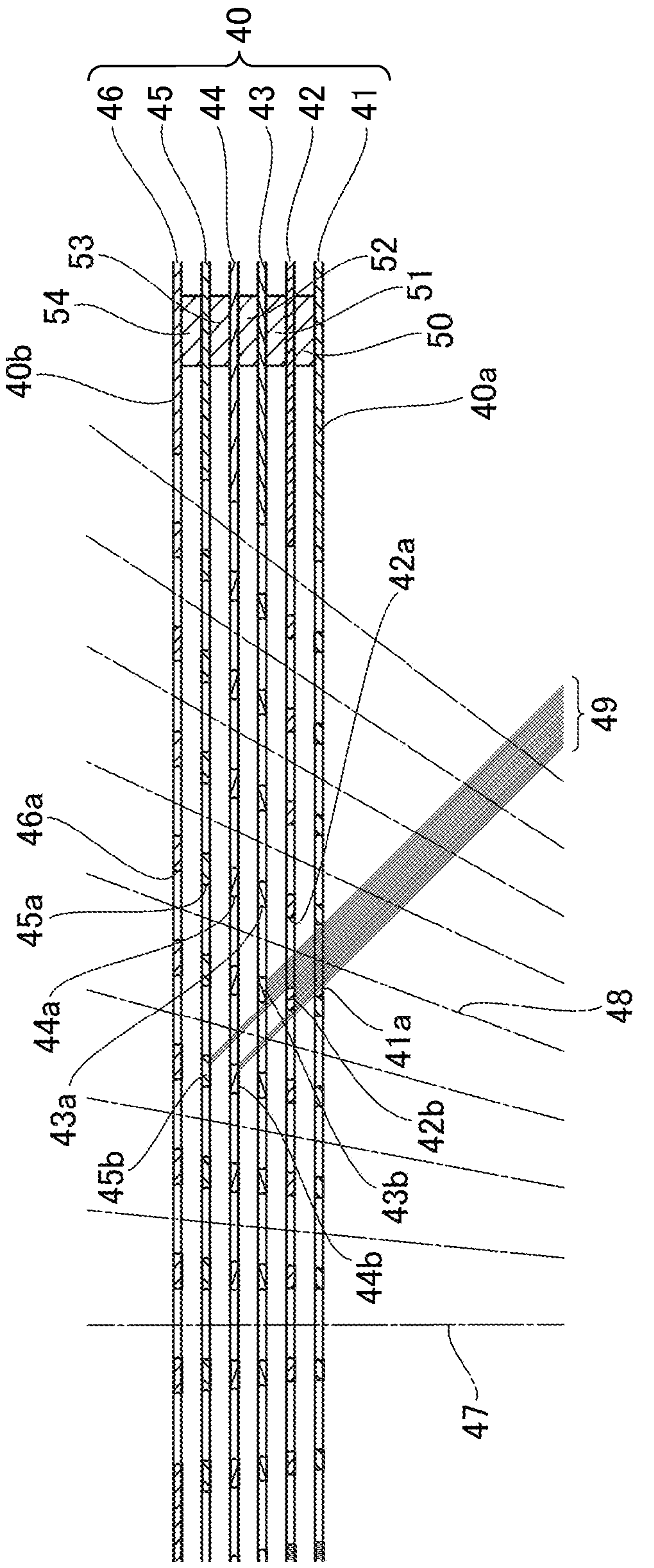
FIG. 27 is a partial sectional view illustrating an angle selection type transmission element of FIG. 26.

FIG. 27 is a partial sectional view illustrating the transmission element 40. The transmission element 40 has a configured in which the plurality of mask members and spacers (separation members) are superimposed. For example, a first spacer 50 is provided on one surface side of the first mask 41. A second mask 42 is located subsequently (on the upper side of FIG. 27) and a second space 51 is further provided. Then, a third mask 43 and a third spacer 52, a fourth mask 44 and a fourth spacer 53, and a fifth mask 45 and a fifth spacer 54 are provided similarly, and a sixth mask 46 is further provided. In this way, the first to fifth spacers are respectively provided between the first to sixth masks and a gap is formed between the mask members.

In FIG. 27, a finder optical axis 47 and a direction oriented to a position of an eyepoint (not illustrated) are indicated by one-dot chain lines. Positions of a plurality of opening portions included in the transmission element 40 are changed in accordance with distances between each of the layers indicated by the first mask 41 to the sixth mask 46 and the finder optical axis 47. Taking a middle light flux indicated by a ray of light 48 as an example, opening portions 41_a_ to 46_a_ in FIG. 27 are provided in the direction of the light flux. That is, the opening portion 41_a_ is provided in the first mask 41, the opening portion 42_a_ is provided in the second mask 42, the opening portion 43_a_ is provided in the third mask 43, the opening portion 44_a_ is provided in the fourth mask 44, the opening portion 45_a_ is provided in the fifth mask 45, and the opening portion 46_a_ is provided in the sixth mask 46. When the finder optical axis 47 is the standard, a distance to the opening portion 41_a_ is the shortest and a distance to the opening portion 46_a_ is the longest.

When there is a gap between the adjacent mask members, there is a possibility of crosstalk light passing through the gap reaching the eyepiece lens system with regard to ghosting. In the present embodiment, countermeasures for reducing the crosstalk light can be taken. An example of light which is a cause of ghosting is indicated by a ray group of light 49 of FIG. 27. For example, light passing through the opening portion 41_a_ of the first mask 41 is blocked by connection regions 42_b_, 43_b_, 44_b_, and 45_b_ between the opening portions. The connection regions 42_b_, 43_b_, 44_b_, and 45_b_ are provided in the second mask 42 to the fifth mask 45, respectively, and are configured such that unnecessary light does not reach the eyepiece lens system because of a light blocking (or light reducing) function of each region.

In the light blocking (or light reducing) function, without blocking incident light indicated as the ray group of light 49 by the connection regions 42_b_, 43_b_, 44_b_, and 45_b_, reflected light may be blocked by an eyepiece lens surface. That is, even when an optical path passing through the opening portion 41_a_ reaches the eyepiece lens surface, the reflected light is blocked by the connection regions 42_b_, 43_b_, 44_b_, and 45_b_ before coming from the other opening portions. Compared to a configuration in which only incident light is blocked or reduced only in an optical path of incidence, it is possible to improve degree of freedom in designing of the connection regions.

In the transmission element 40 according to the present embodiment, glass (not illustrated) is provided on one surface side, and thus intrusion of dust is prevented. Antireflection coating is performed on both surfaces of the glass.

According to the present embodiment, it is possible to implement the angle selection type transmission element in which the similar advantageous effects to those of the foregoing embodiments can be obtained in a configuration that has a plurality of gaps where each separation member is provided between the plurality of mask members.

In the configurations described in the foregoing embodiments, it is possible to provide an optical element and an optical device capable of allowing eyepiece observation to be performed of display information while reducing ghosting caused by light from the rear side of a user. That is, it is possible to observe display information without causing vignetting of a peripheral unit even in a use in which the eyes of the user approach an optical system up to about a few of centimeters or less (a finder or an HMD). When a finder in which the angle selection type transmission element according to the foregoing embodiments is used, a sufficient visual field can be guaranteed and the user can ascertain a surrounding situation. For example, in a method of mounting an eye cup made of rubber on a finder, there is a possibility of the size of the eye cup increasing because it is necessary to bring the face into close contact with an eyepiece portion without a gap. In a device in which the user can make observation with two eyes, such as a binocular telescope or an HMD, an increase in the size of the eye cup results in a narrow visual field, it is difficult for the user to ascertain a surrounding situation, and therefore use is restricted while the user being moving. Applying the angle selection type transmission element according to the present invention to a finder is effective in solving this problem (the eye cup is not necessary or miniaturization is achieved).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An angle selection type transmission element provided on an optical path, the angle selection type transmission element comprising:

a limiter configured to limit a passage direction of a light flux, wherein a passage portion in which the light flux passes in the limiter is formed radially centering on a pre-decided point 3-dimensionally, wherein the angle selection type transmission element is formed by stacking a plurality of plates, wherein the limiter is configured by a plurality of opening portions included in the plurality of plates, and wherein an inside of the opening portion is filled with a material of which a refractive index difference from air is equal to or less than 0.1.

2. The angle selection type transmission element according to claim 1, wherein the passage portion of the light flux is formed radially centering on a point on an optical axis away from the angle selection type transmission element.

3. The angle selection type transmission element according to claim 1, wherein a surface is subjected to an antireflection coating.

4. The angle selection type transmission element according to claim 1, wherein first and second surfaces including the plurality of opening portions in the angle selection type transmission element are configured in a regular tessellation.

5. The angle selection type transmission element according to claim 1, wherein first and second surfaces including the plurality of opening portions in the angle selection type transmission element are configured in an Archimedean regular tessellation of a plurality of types of regular polygons.

6. The angle selection type transmission element according to claim 1, wherein the material is a porous transparent material that includes 90% or more of air.

7. The angle selection type transmission element according to claim 1, wherein the plurality of opening portions are partitioned by walls and the walls are subjected to an antireflection coating.

8. The angle selection type transmission element according to claim 1, wherein walls provided in the opening portions are configured as wall surfaces in at least two directions which are not parallel to a passage direction of light.

9. The angle selection type transmission element according to claim 8, wherein opening sizes of the opening portions are different in front and rear of the piled plates.

10. The angle selection type transmission element according to claim 1, wherein central positions of opening diameters of the opening portions are different in front and rear of the piled plates.

11. The angle selection type transmission element according to claim 1, wherein a plurality of regions where opening sizes or pipe lengths of the opening portions are different are provided in the angle selection type transmission element.

12. The angle selection type transmission element according to claim 1, further comprising:

a plurality of mask members; and a plurality of separation members in which each gap is formed between the plurality of mask members, wherein the limiter is configured by a plurality of opening portions included in the mask members.

* * * * *